(12) United States Patent
Beg

(10) Patent No.: US 11,184,063 B2
(45) Date of Patent: Nov. 23, 2021

(54) ELICITING MIMO TRANSMISSIONS FROM WIRELESS COMMUNICATION DEVICES

(71) Applicant: Cognitive Systems Corp., Waterloo (CA)

(72) Inventor: Christopher Beg, Kitchener (CA)

(73) Assignee: Cognitive Systems Corp., Waterloo (CA)

(*) Notice: Subject to any disclaimer, the term of this patent is extended or adjusted under 35 U.S.C. 154(b) by 0 days.

(21) Appl. No.: 17/318,211

(22) Filed: May 12, 2021

(65) Prior Publication Data

US 2021/0281300 A1 Sep. 9, 2021

Related U.S. Application Data

(63) Continuation of application No. 17/082,411, filed on Oct. 28, 2020, now Pat. No. 11,018,734.
(Continued)

(51) Int. Cl.
*H04B 7/0456* (2017.01)
*H04B 7/0426* (2017.01)
(Continued)

(52) U.S. Cl.
CPC .......... *H04B 7/0465* (2013.01); *H04B 7/043* (2013.01); *H04B 7/0639* (2013.01);
(Continued)

(58) Field of Classification Search
CPC .... H04B 7/0465; H04B 7/043; H04B 7/0639; H04W 80/06; H04W 4/029; H04W 76/18; H04W 64/006
See application file for complete search history.

(56) References Cited

U.S. PATENT DOCUMENTS 4,054,879 A 10/1977 Wright et al.
4,197,537 A 4/1980 Follen et al.
(Continued)

FOREIGN PATENT DOCUMENTS

CA 2834522 5/2014
CA 2945702 8/2015
(Continued)

OTHER PUBLICATIONS

Networking Layers—Apple Developer; https://developer.apple.com/library/archive/documentation/NetworkingInternet/Conceptual/NetworkingConcepts/NetworkingLayers/NetworkingLayers.html, Jul. 19, 2012, 4 pgs.
(Continued)

*Primary Examiner* — Dhaval V Patel
(74) *Attorney, Agent, or Firm* — Henry Patent Law Firm PLLC

(57) ABSTRACT

In a general aspect, MIMO transmissions are elicited from wireless communication devices for wireless sensing. A first wireless communication device may be configured to generate network or transport layer messages addressed to a second wireless communication device in a wireless communication network, and wirelessly transmit the network or transport layer messages to the second wireless communication device to elicit MIMO transmissions from the second wireless communication device. The first wireless communication device may further be configured to receive MIMO transmissions from the second wireless communication device, where the MIMO transmissions traverse a space between the first wireless communication device and the second wireless communication device. The first wireless communication device may additionally be configured to identify a training field in each MIMO transmission, generate channel information based on the respective training
(Continued)

fields, and detect motion that occurred in the space based on the channel information.

24 Claims, 17 Drawing Sheets

Related U.S. Application Data

(60) Provisional application No. 62/944,177, filed on Dec. 5, 2019, provisional application No. 62/928,684, filed on Oct. 31, 2019.

(51) Int. Cl.
| | |
|---|---|
| H04W 80/06 | (2009.01) |
| H04W 76/18 | (2018.01) |
| H04B 7/06 | (2006.01) |
| H04W 4/029 | (2018.01) |
| H04W 64/00 | (2009.01) |

(52) U.S. Cl.
CPC ........... *H04W 4/029* (2018.02); *H04W 76/18* (2018.02); *H04W 80/06* (2013.01); *H04W 64/006* (2013.01)

(56) References Cited

U.S. PATENT DOCUMENTS

| | | | |
|---|---|---|---|
| 4,417,157 A | 11/1983 | Gershberg et al. |
| 4,636,774 A | 1/1987 | Galvin et al. |
| 4,649,388 A | 3/1987 | Atlas |
| 4,740,045 A | 4/1988 | Goodson et al. |
| 5,270,720 A | 12/1993 | Stove |
| 5,613,039 A | 3/1997 | Wang et al. |
| 5,696,514 A | 12/1997 | Nathanson et al. |
| 6,075,797 A | 6/2000 | Thomas |
| 6,380,882 B1 | 4/2002 | Hegnauer |
| 6,573,861 B1 | 6/2003 | Hommel et al. |
| 6,636,763 B1 | 10/2003 | Junker et al. |
| 6,914,854 B1 | 7/2005 | Heberley et al. |
| 7,652,617 B2 | 1/2010 | Kurtz et al. |
| 7,742,753 B2 | 6/2010 | Carrero et al. |
| 8,463,191 B2 | 6/2013 | Farajidana et al. |
| 8,660,578 B1 | 2/2014 | Yang et al. |
| 8,671,069 B2 | 3/2014 | Chang et al. |
| 8,710,984 B2 | 4/2014 | Wilson et al. |
| 8,760,392 B2 | 6/2014 | Lloyd et al. |
| 8,812,654 B2 | 8/2014 | Gelvin et al. |
| 8,832,244 B2 | 9/2014 | Gelvin et al. |
| 8,836,344 B2 | 9/2014 | Habib et al. |
| 8,836,503 B2 | 9/2014 | Gelvin et al. |
| 8,934,884 B2 | 1/2015 | Gustafsson et al. |
| 9,019,148 B1 | 4/2015 | Bikhazi et al. |
| 9,030,321 B2 | 5/2015 | Breed |
| 9,161,172 B2 | 10/2015 | Poduri et al. |
| 9,253,592 B1 | 2/2016 | Moscovich et al. |
| 9,329,701 B2 | 5/2016 | Lautner |
| 9,389,085 B2 | 7/2016 | Khorashadi et al. |
| 9,523,760 B1 | 12/2016 | Kravets et al. |
| 9,524,628 B1 | 12/2016 | Omer et al. |
| 9,551,784 B2 | 1/2017 | Katuri et al. |
| 9,584,974 B1 | 2/2017 | Omer et al. |
| 9,609,468 B1 | 3/2017 | Moscovich et al. |
| 9,628,365 B2 | 4/2017 | Gelvin et al. |
| 9,692,459 B2 | 6/2017 | Maltsev et al. |
| 9,743,294 B1 | 8/2017 | Omer et al. |
| 9,866,308 B1 | 1/2018 | Bultan et al. |
| 9,869,759 B2 | 1/2018 | Furuskog et al. |
| 9,927,519 B1 | 3/2018 | Omer et al. |
| 9,933,517 B1 | 4/2018 | Olekas et al. |
| 9,946,351 B2 | 4/2018 | Sakaguchi et al. |
| 9,989,622 B1 | 6/2018 | Griesdorf et al. |
| 10,004,076 B1 | 6/2018 | Griesdorf et al. |
| 10,048,350 B1 | 8/2018 | Piao et al. |
| 10,051,414 B1 | 8/2018 | Omer et al. |
| 10,077,204 B2 | 9/2018 | Maschmeyer et al. |
| 10,108,903 B1 | 10/2018 | Piao et al. |
| 10,109,167 B1 | 10/2018 | Olekas et al. |
| 10,109,168 B1 | 10/2018 | Devison et al. |
| 10,111,228 B2 | 10/2018 | Griesdorf et al. |
| 10,129,853 B2 | 11/2018 | Manku et al. |
| 10,228,439 B1 | 3/2019 | Olekas et al. |
| 10,264,405 B1 | 4/2019 | Manku et al. |
| 10,318,890 B1 | 6/2019 | Kravets et al. |
| 10,349,216 B1 | 7/2019 | Tran et al. |
| 10,380,856 B1 | 8/2019 | Devison et al. |
| 10,393,866 B1 | 8/2019 | Kravets et al. |
| 10,404,387 B1 | 9/2019 | Devison et al. |
| 10,438,468 B2 | 10/2019 | Olekas et al. |
| 10,459,074 B1 | 10/2019 | Omer et al. |
| 10,459,076 B2 | 10/2019 | Kravets et al. |
| 10,460,581 B1 | 10/2019 | Devison et al. |
| 10,498,467 B1 | 12/2019 | Ravkine |
| 10,499,364 B1 | 12/2019 | Ravkine |
| 10,506,384 B1 | 12/2019 | Omer et al. |
| 10,565,860 B1 | 2/2020 | Omer et al. |
| 10,567,914 B1 | 2/2020 | Omer et al. |
| 10,600,314 B1 | 3/2020 | Manku et al. |
| 10,605,907 B2 | 3/2020 | Kravets et al. |
| 10,605,908 B2 | 3/2020 | Kravets et al. |
| 10,743,143 B1 | 8/2020 | Devison et al. |
| 10,849,006 B1 | 11/2020 | Beg et al. |
| 2002/0080014 A1 | 6/2002 | McCarthy et al. |
| 2003/0108119 A1 | 6/2003 | Mohebbi et al. |
| 2005/0055568 A1 | 3/2005 | Agrawala et al. |
| 2005/0128067 A1 | 6/2005 | Zakrewski |
| 2006/0152404 A1 | 7/2006 | Fullerton et al. |
| 2006/0217132 A1 | 9/2006 | Drummond-Murray et al. |
| 2006/0284757 A1 | 12/2006 | Zemany |
| 2007/0036353 A1 | 2/2007 | Reznik et al. |
| 2007/0296571 A1 | 12/2007 | Kolen |
| 2008/0007404 A1 | 1/2008 | Albert et al. |
| 2008/0057978 A1 | 3/2008 | Karaoguz et al. |
| 2008/0119130 A1 | 5/2008 | Sinha |
| 2008/0240008 A1 | 10/2008 | Backes et al. |
| 2008/0258907 A1 | 10/2008 | Kalpaxis |
| 2008/0300055 A1 | 12/2008 | Lutnick et al. |
| 2008/0303655 A1 | 12/2008 | Johnson |
| 2009/0062696 A1 | 3/2009 | Nathan et al. |
| 2009/0180444 A1 | 7/2009 | Mcmanus et al. |
| 2010/0073686 A1 | 3/2010 | Medeiros et al. |
| 2010/0127853 A1 | 5/2010 | Hanson et al. |
| 2010/0130229 A1 | 5/2010 | Sridhara et al. |
| 2010/0207804 A1 | 8/2010 | Hayward et al. |
| 2010/0234045 A1 | 9/2010 | Karr et al. |
| 2010/0306320 A1 | 12/2010 | Leppanen et al. |
| 2010/0315284 A1 | 12/2010 | Trizna et al. |
| 2011/0019587 A1 | 1/2011 | Wang |
| 2011/0035491 A1 | 2/2011 | Gelvin et al. |
| 2011/0090081 A1 | 4/2011 | Khorashadi et al. |
| 2011/0148689 A1 | 6/2011 | Filippi et al. |
| 2011/0260856 A1 | 10/2011 | Rossmann et al. |
| 2011/0260871 A1 | 10/2011 | Karkowski |
| 2011/0263946 A1 | 10/2011 | El Kaliouby et al. |
| 2012/0115512 A1 | 5/2012 | Grainger et al. |
| 2012/0146788 A1 | 6/2012 | Wilson et al. |
| 2012/0182429 A1 | 7/2012 | Forutanpour et al. |
| 2012/0184296 A1 | 7/2012 | Milosiu |
| 2012/0283896 A1 | 11/2012 | Persaud |
| 2013/0017836 A1 | 1/2013 | Chang et al. |
| 2013/0045759 A1 | 2/2013 | Smith |
| 2013/0090151 A1 | 4/2013 | Ngai et al. |
| 2013/0094538 A1 | 4/2013 | Wang |
| 2013/0113647 A1 | 5/2013 | Sentelle et al. |
| 2013/0162459 A1 | 6/2013 | Aharony et al. |
| 2013/0178231 A1 | 7/2013 | Morgan |
| 2013/0283256 A1 | 10/2013 | Proud |
| 2014/0015706 A1 | 1/2014 | Ishihara et al. |
| 2014/0073346 A1 | 3/2014 | Yang et al. |
| 2014/0126323 A1 | 5/2014 | Li et al. |
| 2014/0135042 A1 | 5/2014 | Buchheim et al. |
| 2014/0148195 A1 | 5/2014 | Bassan-Eskenazi et al. |
| 2014/0213284 A1 | 7/2014 | Yang et al. |
| 2014/0247179 A1 | 9/2014 | Furuskog |

(56) References Cited

U.S. PATENT DOCUMENTS

| | | |
|---|---|---|
| 2014/0266669 A1 | 9/2014 | Fadell et al. |
| 2014/0274218 A1 | 9/2014 | Kadiwala et al. |
| 2014/0286380 A1 | 9/2014 | Prager et al. |
| 2014/0288876 A1 | 9/2014 | Donaldson |
| 2014/0329540 A1 | 11/2014 | Duggan et al. |
| 2014/0355713 A1 | 12/2014 | Bao et al. |
| 2014/0358473 A1 | 12/2014 | Goel et al. |
| 2014/0361920 A1 | 12/2014 | Katuri et al. |
| 2015/0043377 A1 | 2/2015 | Cholas et al. |
| 2015/0049701 A1 | 2/2015 | Tian et al. |
| 2015/0063323 A1 | 3/2015 | Sadek et al. |
| 2015/0078295 A1 | 3/2015 | Mandyam et al. |
| 2015/0098377 A1 | 4/2015 | Amini et al. |
| 2015/0159100 A1 | 6/2015 | Shi et al. |
| 2015/0181388 A1 | 6/2015 | Smith |
| 2015/0195100 A1 | 7/2015 | Imes et al. |
| 2015/0212205 A1 | 7/2015 | Shpater |
| 2015/0245164 A1 | 8/2015 | Merrill |
| 2015/0269825 A1 | 9/2015 | Tran |
| 2015/0288745 A1 | 10/2015 | Moghaddam et al. |
| 2015/0304886 A1 | 10/2015 | Liu |
| 2015/0309166 A1 | 10/2015 | Sentelle et al. |
| 2015/0312877 A1 | 10/2015 | Bhanage |
| 2015/0338507 A1 | 11/2015 | Oh et al. |
| 2015/0350849 A1 | 12/2015 | Huang et al. |
| 2015/0350976 A1 | 12/2015 | Kodali et al. |
| 2015/0366542 A1 | 12/2015 | Brown et al. |
| 2016/0014554 A1 | 1/2016 | Sen et al. |
| 2016/0018508 A1 | 1/2016 | Chen et al. |
| 2016/0073060 A1 | 3/2016 | Renkis |
| 2016/0080908 A1 | 3/2016 | Julian et al. |
| 2016/0088438 A1 | 3/2016 | O'Keeffe |
| 2016/0088631 A1 | 3/2016 | Hedayat et al. |
| 2016/0135205 A1 | 5/2016 | Barbu et al. |
| 2016/0150418 A1 | 5/2016 | Kang et al. |
| 2016/0178741 A1 | 6/2016 | Ludlow et al. |
| 2016/0183059 A1 | 6/2016 | Nagy et al. |
| 2016/0187475 A1 | 6/2016 | Horng et al. |
| 2016/0203689 A1 | 7/2016 | Hintz et al. |
| 2016/0210838 A1 | 7/2016 | Yan et al. |
| 2016/0217683 A1 | 7/2016 | Li |
| 2016/0261452 A1 | 9/2016 | Porat et al. |
| 2016/0262355 A1 | 9/2016 | Swan |
| 2016/0363663 A1 | 12/2016 | Mindell et al. |
| 2017/0042488 A1 | 2/2017 | Muhsin |
| 2017/0052247 A1 | 2/2017 | Kong et al. |
| 2017/0055126 A1* | 2/2017 | O'Keeffe ............... H04W 4/023 |
| 2017/0055131 A1 | 2/2017 | Kong et al. |
| 2017/0059190 A1 | 3/2017 | Stefanski et al. |
| 2017/0086281 A1 | 3/2017 | Avrahamy |
| 2017/0090026 A1* | 3/2017 | Joshi ....................... G01S 13/56 |
| 2017/0111852 A1 | 4/2017 | Selen et al. |
| 2017/0123528 A1 | 5/2017 | Hu et al. |
| 2017/0126488 A1 | 5/2017 | Cordeiro et al. |
| 2017/0146656 A1 | 5/2017 | Belsley et al. |
| 2017/0150255 A1 | 5/2017 | Wang et al. |
| 2017/0155439 A1 | 6/2017 | Chang et al. |
| 2017/0177618 A1 | 6/2017 | Hu et al. |
| 2017/0180882 A1 | 6/2017 | Lunner et al. |
| 2017/0195893 A1 | 7/2017 | Lee et al. |
| 2017/0223628 A1 | 8/2017 | Snyder et al. |
| 2017/0251392 A1 | 8/2017 | Nabetani |
| 2017/0278374 A1 | 9/2017 | Skaaksrud |
| 2017/0280351 A1 | 9/2017 | Skaaksrud |
| 2017/0311279 A1 | 10/2017 | Martinez et al. |
| 2017/0311574 A1 | 11/2017 | Swan |
| 2017/0343658 A1* | 11/2017 | Ramirez ............ G08B 13/2491 |
| 2017/0359804 A1 | 12/2017 | Manku et al. |
| 2018/0027389 A1 | 1/2018 | Shirakata et al. |
| 2018/0086264 A1 | 3/2018 | Pedersen |
| 2018/0106885 A1 | 4/2018 | Blayvas |
| 2018/0120420 A1 | 5/2018 | Mcmahon et al. |
| 2018/0168552 A1 | 6/2018 | Shi et al. |
| 2018/0180706 A1 | 6/2018 | Li et al. |
| 2018/0184907 A1 | 7/2018 | Tran |
| 2018/0270821 A1 | 9/2018 | Griesdorf et al. |
| 2018/0288587 A1 | 10/2018 | Martinez et al. |
| 2018/0330293 A1 | 11/2018 | Kulkarni et al. |
| 2019/0033446 A1 | 1/2019 | Bultan et al. |
| 2019/0122514 A1 | 4/2019 | Olekas et al. |
| 2019/0146075 A1 | 5/2019 | Kravets et al. |
| 2019/0146076 A1 | 5/2019 | Kravets et al. |
| 2019/0146077 A1 | 5/2019 | Kravets et al. |
| 2019/0147713 A1 | 5/2019 | Devison et al. |
| 2019/0156943 A1 | 5/2019 | Kocherscheidt et al. |
| 2019/0170869 A1 | 6/2019 | Kravets et al. |
| 2019/0272718 A1 | 9/2019 | Hurtig et al. |
| 2019/0294833 A1 | 9/2019 | Lu et al. |
| 2019/0327124 A1 | 10/2019 | Lai et al. |
| 2020/0112939 A1 | 4/2020 | Scharf et al. |
| 2020/0175405 A1 | 6/2020 | Omer et al. |
| 2020/0178033 A1 | 6/2020 | Omer et al. |
| 2020/0204222 A1* | 6/2020 | Lou ..................... H04B 7/0417 |
| 2020/0209378 A1 | 7/2020 | Yokev et al. |
| 2020/0264292 A1 | 8/2020 | Kravets et al. |
| 2020/0305231 A1 | 9/2020 | Sadeghi et al. |
| 2020/0351576 A1 | 11/2020 | Beg et al. |
| 2020/0351692 A1 | 11/2020 | Beg et al. |
| 2020/0367021 A1 | 11/2020 | Devison et al. |
| 2020/0371222 A1 | 11/2020 | Kravets et al. |
| 2021/0099835 A1 | 4/2021 | Omer |
| 2021/0099836 A1 | 4/2021 | Omer |
| 2021/0099970 A1 | 4/2021 | Omer |
| 2021/0103045 A1 | 4/2021 | Kravets et al. |
| 2021/0135718 A1 | 5/2021 | Beg |

FOREIGN PATENT DOCUMENTS

| | | |
|---|---|---|
| CN | 102037667 | 1/2015 |
| CN | 111373281 | 7/2020 |
| EP | 2733684 | 5/2014 |
| JP | 1997-507298 | 7/1997 |
| JP | 2004286567 | 10/2004 |
| JP | 2013072865 | 4/2013 |
| JP | 6324935 | 5/2018 |
| JP | 6776374 | 10/2020 |
| WO | 2014021574 | 2/2014 |
| WO | 2014201574 | 12/2014 |
| WO | 2015168700 | 11/2015 |
| WO | 2016005977 | 1/2016 |
| WO | 2016066822 | 5/2016 |
| WO | 2016110844 | 7/2016 |
| WO | 2017106976 | 6/2017 |
| WO | 2017132765 | 8/2017 |
| WO | 2017177303 | 10/2017 |
| WO | 2017210770 | 12/2017 |
| WO | 2018071456 | 4/2018 |
| WO | 2018094502 | 5/2018 |
| WO | 2019041019 | 3/2019 |
| WO | 2019075551 | 4/2019 |
| WO | 2020150806 | 7/2020 |
| WO | 2020150807 | 7/2020 |
| WO | 2020227804 | 11/2020 |
| WO | 2020227805 | 11/2020 |
| WO | 2020227806 | 11/2020 |
| WO | 2021081635 | 5/2021 |
| WO | 2021081637 | 5/2021 |

OTHER PUBLICATIONS

Banerjee , et al., "Through Wall People Localization Exploiting Radio Windows", arXiv:1307.7233v1, Jul. 27, 2013, 14 pgs.

Bejarano , et al., "IEEE 802.11ac: From Channelization to Multi-User MIMO", IEEE Communications Magazine, Oct. 1, 2013, 7 pgs.

Brauers , et al., "Augmenting OFDM Wireless Local Networks with Motion detection Capability", 2016 IEEE 6th International Conference on Consumer Electronics—Berlin (ICCE—Berlin); pp. 253-257, 2016, 5 pgs.

Cai , et al., "Human Movement Detection in Wi-Fi Mesh Networks", Technical Disclosure Commons, Dec. 17, 2017, 8 pgs.

(56) References Cited

OTHER PUBLICATIONS

Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.

Domenico, et al., "Exploring Training Options for RF Sensing Using CSI", IEEE Communications Magazine, 2018, vol. 56, Issue 5, pp. 116-123, 8 pgs.

Ganesan, et al., "Robust Channel Estimation for 802.11n (MIMO-OFDM) Systems", 2014 International Conference on Signal Processing and Communications (SPCOM), Bangalore; Jul. 22-25, 2014, 5 pgs.

Iqbal, et al., "Indoor Motion Classification Using Passive RF Sensing Incorporating Deep Learning", ISSN 2577-2465, Electronic IEEE, Jun. 3, 2018, 5 pgs.

Keerativoranan, et al., "Mitigation of CSI Temporal Phase Rotation with B2B Calibration Method for Fine-Grained Motion Detection Analysis on Commodity Wi-Fi Devices", Sensors 2018, Nov. 6, 2018, 18 pgs.

Kosba, et al., "Robust WLAN Device-free Passive Motion Detection", IEEE Wireless Communications and Networking Conference, Apr. 2012, 6 pgs.

Krumm, et al., "Locadio: Inferring Motion and Location from Wi-Fi Signal Strengths", First Annual Int'l Conference on Mobile and Ubiquitous Systems: Networking and Services, Boston, MA, Aug. 22, 2004, 10 pgs.

Lai, "This mesh WiFi router can track motion to protect your family", https://www.engadget.com/2018-06-06-origin-wireless-wifi-mesh-motion-fall-sleep-detection.htm., Jun. 16, 2018, 6 pgs.

Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.

Youssef, et al., "Challenges: Device-free Passive Localization for Wireless Environments", Proceedings of the 13th Annual ACM Int'l Conference on Mobile Computing and Networking, Montreal, Canada, Sep. 9, 2007, 8 pgs.

USPTO, Notice of Allowance dated Jan. 22, 2021 in U.S. Appl. No. 17/082,456, 35 pgs.

WIPO, International Search Report and Written Opinion dated Dec. 30, 2020, in PCT/CA2020/051442, 8 pgs.

WIPO, International Search Report and Written Opinion dated Jan. 11, 2021, in PCT/CA2020/051440, 8 pgs.

* cited by examiner

ELICITING MIMO TRANSMISSIONS FROM WIRELESS COMMUNICATION DEVICES

CROSS-REFERENCE TO RELATED APPLICATIONS

This application is a continuation of U.S. patent application Ser. No. 17/082,411, filed Oct. 28, 2020, entitled "Eliciting MIMO Transmissions from Wireless Communication Devices," which claims priority to U.S. Provisional App. No. 62/944,177, filed Dec. 5, 2019, entitled "Eliciting MIMO Transmissions from Wireless Communication Devices," and U.S. Provisional App. No. 62/928,684, filed Oct. 31, 2019, entitled "Using MIMO Training Fields for Motion Detection," the contents of which are hereby incorporated by reference.

BACKGROUND

The following description relates to eliciting multiple-input/multiple-output (MIMO) transmissions from wireless communication devices, for example, for wireless motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DETAILED DESCRIPTION

Figure 1:
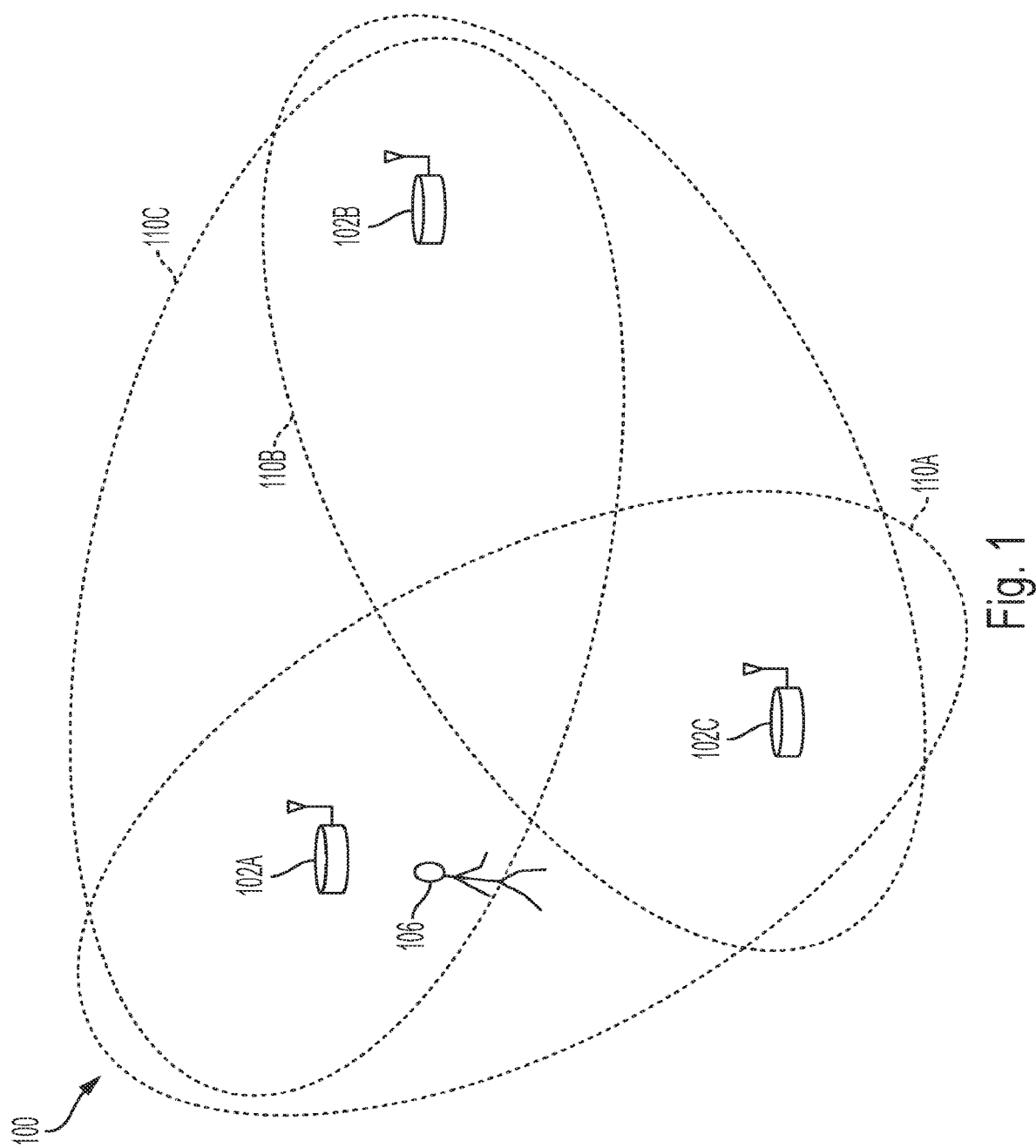
FIG. 1 is a diagram showing an example wireless communication system.

In some aspects of what is described here, a wireless sensing system can process wireless signals (e.g., radio frequency signals) transmitted through a space between wireless communication devices for wireless sensing applications. Example wireless sensing applications include detecting motion, which can include one or more of the following: detecting motion of objects in the space, motion tracking, localization of motion in a space, breathing detection, breathing monitoring, presence detection, gesture detection, gesture recognition, human detection (e.g., moving and stationary human detection), human tracking, fall detection, speed estimation, intrusion detection, walking detection, step counting, respiration rate detection, sleep pattern detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, metal detection, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals.

The examples described herein may be useful for home monitoring. In some instances, home monitoring using the wireless sensing systems described herein may provide several advantages, including full home coverage through walls and in darkness, discreet detection without cameras, higher accuracy and reduced false alerts (e.g., in comparison with sensors that do not use Wi-Fi signals to sense their environments), and adjustable sensitivity. By layering Wi-Fi motion detection capabilities into routers and gateways, a robust motion detection system may be provided.

The examples described herein may also be useful for wellness monitoring. Caregivers want to know their loved ones are safe, while seniors and people with special needs want to maintain their independence at home with dignity. In some instances, wellness monitoring using the wireless sensing systems described herein may provide a solution that uses wireless signals to detect motion without using cameras or infringing on privacy, generates alerts when unusual activity is detected, tracks sleep patterns, and generates preventative health data. For example, caregivers can monitor motion, visits from health care professionals, and unusual behavior such as staying in bed longer than normal. Furthermore, motion is monitored unobtrusively without the need for wearable devices, and the wireless sensing systems described herein offer a more affordable and convenient alternative to assisted living facilities and other security and health monitoring tools.

The examples described herein may also be useful for setting up a smart home. In some examples, the wireless sensing systems described herein use predictive analytics and artificial intelligence (AI), to learn motion patterns and trigger smart home functions accordingly. Examples of smart home functions that may be triggered included adjusting the thermostat when a person walk through the front door, turning other smart devices on or off based on preferences, automatically adjusting lighting, adjusting HVAC systems based on present occupants, etc.

In some instances, aspects of the systems and techniques described here provide technical improvements and advantages over existing approaches. In some wireless network environments, certain wireless communication devices may not automatically send MIMO transmissions in response to certain PHY layer or MAC layer messages. The PHY layer, also known as the physical layer, can refer to Layer 1 of the Open System Interconnection (OSI) model, and the MAC layer, also known as the data link layer, can refer to Layer 2 of the OSI model. In aspects of the systems and techniques described, messages initiated by protocols in higher layers (e.g., layers above Layers 1 and 2 of the OSI model) may be used to elicit MIMO transmissions from wireless communication devices. For example, network layer messages (e.g., ICMP Ping, ARP Ping, or modified versions of these and other network layer processes) and transport layer messages (e.g., TCP Ping, or modified versions of this and other transport layer processes) may be used to cause one or more wireless communication devices to send a wireless transmission that includes a MIMO training field.

The MIMO training field contains signals having a higher frequency resolution, a greater number of subcarrier frequencies, and a higher frequency bandwidth compared to Legacy training fields in the PHY frame. Use of the MIMO training field for motion detection provides more accurate motion detection capabilities. For example, in some instances, motion detection can be performed with higher spatial and temporal resolution, precision, and accuracy with the use of PHY frames, each having a respective MIMO training field. Further, since the MIMO transmissions are elicited using protocols in higher layers, MIMO transmissions may be elicited from a broader range of wireless communication devices, in a more efficient manner, or both. The ability of a wireless sensing system to elicit MIMO transmissions from a broader range of wireless communication devices can allow the wireless sensing system to operate in more diverse environments and to cover greater spatial areas. In addition, MIMO transmissions may be elicited using existing resources on the responding device, for instance, without having to install any additional hardware, software, or firmware on the responding device (e.g., reducing or eliminating a requirement for specialized motion detection hardware in some cases). Further, the systems and techniques described here may be utilized in wireless motion detection systems or other types of wireless sensing systems. For instance, eliciting MIMO transmissions may be useful in a variety of wireless sensing systems that utilize channel state information (CSI) derived from wireless signals (e.g., systems that take a CSI channel response and apply digital-signal-processing, machine learning, or other types of analysis to the CSI channel response). The technical improvements and advantages achieved in examples where the wireless sensing system is used for motion detection may also be achieved in examples where the wireless sensing system is used for other wireless sensing applications.

In some instances, a wireless sensing system can be implemented using a wireless communication network. Wireless signals received at one or more wireless communication devices in the wireless communication network may be analyzed to determine channel information for the different communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (MIMO) radio systems for directional signal transmission or reception. Beamforming can be achieved by operating elements in an antenna array in such a way that signals at particular angles experience constructive interference while others experience destructive interference.

The channel information for each of the communication links may be analyzed by one or more motion detection algorithms (e.g., running on a hub device, a client device, or other device in the wireless communication network, or on a remote device communicably coupled to the network) to detect, for example, whether motion has occurred in the space, to determine a relative location of the detected motion, or both. In some aspects, the channel information for each of the communication links may be analyzed to detect whether an object is present or absent, e.g., when no motion is detected in the space.

In some instances, a motion detection system returns motion data. In some implementations, motion data is a result that is indicative of a degree of motion in the space, the location of motion in the space, the direction of motion in the space, a time at which the motion occurred, or a combination thereof. In some instances, the motion data can include a motion score, which may include, or may be, one or more of the following: a scalar quantity indicative of a level of signal perturbation in the environment accessed by the wireless signals; an indication of whether there is motion; an indication of whether there is an object present; or an indication or classification of a gesture performed in the environment accessed by the wireless signals.

In some implementations, the motion detection system can be implemented using one or more motion detection algorithms. Example motion detection algorithms that can be used to detect motion based on wireless signals include the techniques described in U.S. Pat. No. 9,523,760 entitled "Detecting Motion Based on Repeated Wireless Transmissions," U.S. Pat. No. 9,584,974 entitled "Detecting Motion Based on Reference Signal Transmissions," U.S. Pat. No. 10,051,414 entitled "Detecting Motion Based On Decompositions Of Channel Response Variations," U.S. Pat. No. 10,048,350 entitled "Motion Detection Based on Groupings of Statistical Parameters of Wireless Signals," U.S. Pat. No. 10,108,903 entitled "Motion Detection Based on Machine Learning of Wireless Signal Properties," U.S. Pat. No. 10,109,167 entitled "Motion Localization in a Wireless Mesh Network Based on Motion Indicator Values," U.S. Pat. No. 10,109,168 entitled "Motion Localization Based on Channel Response Characteristics," U.S. Pat. No. 10,743,143 entitled "Determining a Motion Zone for a Location of Motion Detected by Wireless Signals," U.S. Pat. No. 10,605,908 entitled "Motion Detection Based on Beamforming Dynamic Information from Wireless Standard Client Devices," U.S. Pat. No. 10,605,907 entitled "Motion Detection by a Central Controller Using Beamforming Dynamic Information," U.S. Pat. No. 10,600,314 entitled "Modifying Sensitivity Settings in a Motion Detection System," U.S. Pat. No. 10,567,914 entitled "Initializing Probability Vectors for Determining a Location of Motion Detected from Wireless Signals," U.S. Pat. No. 10,565,860 entitled "Offline Tuning System for Detecting New Motion Zones in a Motion Detection System," U.S. Pat. No. 10,506,384 entitled "Determining a Location of Motion Detected from Wireless Signals Based on Prior Probability, U.S. Pat. No. 10,499,364 entitled "Identifying Static Leaf Nodes in a Motion Detection System," U.S. Pat. No. 10,498,467 entitled "Classifying Static Leaf Nodes in a Motion Detection System," U.S. Pat. No. 10,460,581 entitled "Determining a Confidence for a Motion Zone Identified as a Location of Motion for Motion Detected by Wireless Signals," U.S. Pat. No. 10,459,076 entitled "Motion Detection based on Beamforming Dynamic Information," U.S. Pat. No. 10,459,074 entitled "Determining a Location of Motion Detected from Wireless Signals Based on Wireless Link Counting," U.S. Pat. No. 10,438,468 entitled "Motion Localization in a Wireless Mesh Network Based on Motion Indicator Values," U.S. Pat. No. 10,404,387 entitled "Determining Motion Zones in a Space Traversed by Wireless Signals," U.S. Pat. No. 10,393,866 entitled "Detecting Presence Based on Wireless Signal Analysis," U.S. Pat. No. 10,380,856 entitled "Motion Localization Based on Channel Response Characteristics," U.S. Pat. No. 10,318,890 entitled "Training Data for a Motion Detection System using Data from a Sensor Device," U.S. Pat. No. 10,264,405 entitled "Motion Detection in Mesh Networks," U.S. Pat. No. 10,228,439 entitled "Motion Detection Based on Filtered Statistical Parameters of Wireless Signals," U.S. Pat. No. 10,129,853 entitled "Operating a Motion Detection Channel in a Wireless Communication Network," U.S. Pat. No. 10,111,228 entitled "Selecting Wireless Communication Channels Based on Signal Quality Metrics," and other techniques.

FIG. 1 illustrates an example wireless communication system 100. The wireless communication system 100 may perform one or more operations of a motion detection system. The technical improvements and advantages achieved from using the wireless communication system 100 to detect motion are also applicable in examples where the wireless communication system 100 is used for another wireless sensing application.

The example wireless communication system 100 includes three wireless communication devices 102A, 102B, 102C. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In some cases, one or more of the wireless communication devices 102 is a Wi-Fi access point or another type of wireless access point (WAP). In some cases, one or more of the wireless communication devices 102 is an access point of a wireless mesh network, such as, for example, a commercially-available mesh network system (e.g., GOOGLE Wi-Fi, EERO mesh, etc.). In some instances, one or more of the wireless communication devices 102 can be implemented as wireless access points (APs) in a mesh network, while the other wireless communication device(s) 102 are implemented as leaf devices (e.g., mobile devices, smart devices, etc.) that access the mesh network through one of the APs. In some cases, one or more of the wireless communication devices 102 is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

In the example shown in FIG. 1, the wireless communication devices transmit wireless signals to each other over wireless communication links (e.g., according to a wireless network standard or a non-standard wireless communication protocol), and the wireless signals communicated between the devices can be used as motion probes to detect motion of objects in the signal paths between the devices. In some implementations, standard signals (e.g., channel sounding signals, beacon signals), non-standard reference signals, or other types of wireless signals can be used as motion probes.

In the example shown in FIG. 1, the wireless communication link between the wireless communication devices 102A, 102C can be used to probe a first motion detection zone 110A, the wireless communication link between the wireless communication devices 102B, 102C can be used to probe a second motion detection zone 110B, and the wireless communication link between the wireless communication device 102A, 102B can be used to probe a third motion detection zone 110C. In some instances, the motion detection zones 110 can include, for example, air, solid materials, liquids, or another medium through which wireless electromagnetic signals may propagate.

In the example shown in FIG. 1, when an object moves in any of the motion detection zones 110, the motion detection system may detect the motion based on signals transmitted through the relevant motion detection zone 110. Generally, the object can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object.

In some examples, the wireless signals may propagate through a structure (e.g., a wall) before or after interacting with a moving object, which may allow the object's motion to be detected without an optical line-of-sight between the moving object and the transmission or receiving hardware. In some instances, the motion detection system may communicate the motion detection event to another device or system, such as a security system or a control center.

In some cases, the wireless communication devices 102 themselves are configured to perform one or more operations of the motion detection system, for example, by executing computer-readable instructions (e.g., software or firmware) on the wireless communication devices. For example, each device may process received wireless signals to detect motion based on changes in the communication channel. In some cases, another device (e.g., a remote server, a cloud-based computer system, a network-attached device, etc.) is configured to perform one or more operations of the motion detection system. For example, each wireless communication device 102 may send channel information to a specified device, system or service that performs operations of the motion detection system.

In an example aspect of operation, wireless communication devices 102A, 102B may broadcast wireless signals or address wireless signals to the other wireless communication device 102C, and the wireless communication device 102C (and potentially other devices) receives the wireless signals transmitted by the wireless communication devices 102A, 102B. The wireless communication device 102C (or another system or device) then processes the received wireless signals to detect motion of an object in a space accessed by the wireless signals (e.g., in the zones 110A, 11B). In some instances, the wireless communication device 102C (or another system or device) may perform one or more operations of a motion detection system.

Figure 2A:
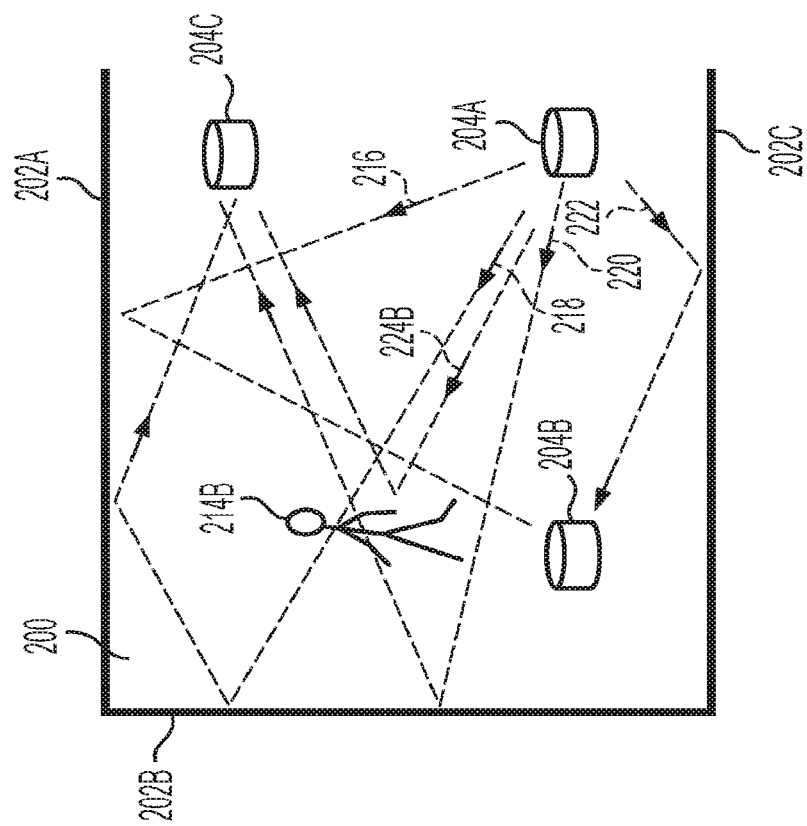
FIGS. 2A-2B are diagrams showing example wireless signals communicated between wireless communication devices.
Figure 2B:
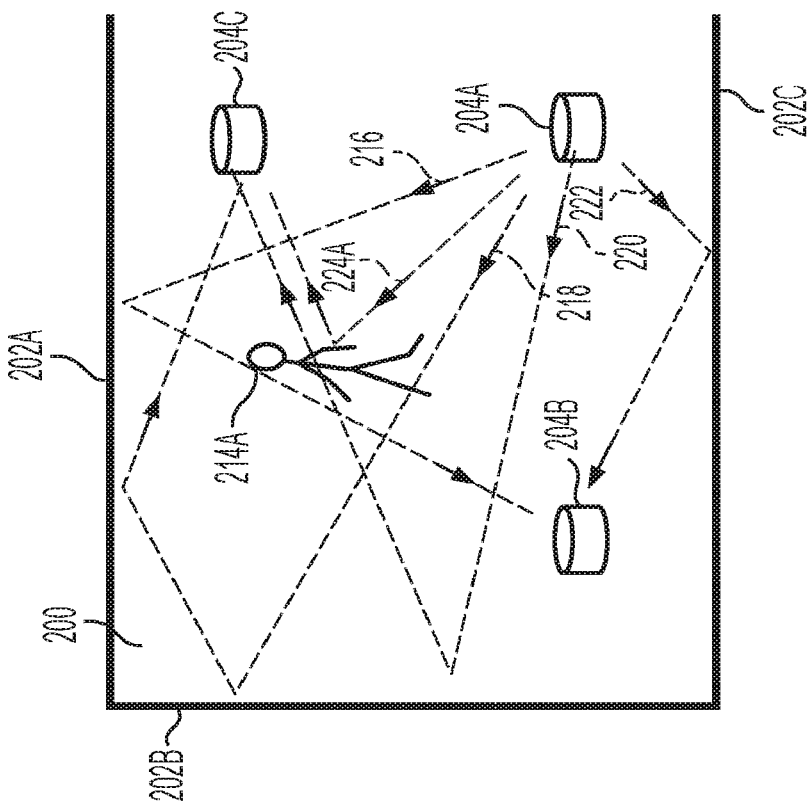

FIGS. 2A and 2B are diagrams showing example wireless signals communicated between wireless communication devices 204A, 204B, 204C. The wireless communication devices 204A, 204B, 204C may be, for example, the wireless communication devices 102A, 102B, 102C shown in FIG. 1, or may be other types of wireless communication devices.

In some cases, a combination of one or more of the wireless communication devices 204A, 204B, 204C can be part of, or may be used by, a motion detection system. The example wireless communication devices 204A, 204B, 204C can transmit wireless signals through a space 200. The example space 200 may be completely or partially enclosed or open at one or more boundaries of the space 200. The space 200 may be or may include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A transmits wireless motion probe signals repeatedly (e.g., periodically, intermittently, at scheduled, unscheduled or random intervals, etc.). The second and third wireless communication devices 204B, 204C receive signals based on the motion probe signals transmitted by the wireless communication device 204A.

As shown, an object is in a first position 214A at an initial time (t0) in FIG. 2A, and the object has moved to a second position 214B at subsequent time (t1) in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object. In the example shown in FIGS. 2A and 2B, the wireless communication devices 204A, 204B, 204C are stationary and are, consequently, at the same position at the initial time t0 and at the subsequent time t1. However, in other examples, one or more of the wireless communication devices 204A, 204B, 204C may be mobile and may move between initial time t0 and subsequent time t1.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between time t0 in FIG. 2A and time t1 in FIG. 2B, the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

The transmitted signal may have a number of frequency components in a frequency bandwidth, and the transmitted signal may include one or more bands within the frequency bandwidth. The transmitted signal may be transmitted from the first wireless communication device 204A in an omni-directional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset applied to a wireless signal along a signal path can change, and hence, the transfer function of the space 200 can change. When the same wireless signal is transmitted from the first wireless communication device 204A, if the transfer function of the space 200 changes, the output of that transfer function, e.g. the received signal, can also change. A change in the received signal can be used to detect motion of an object. Conversely, in some cases, if the transfer function of the space does not change, the output of the transfer function—the received signal—may not change.

Figure 2C:
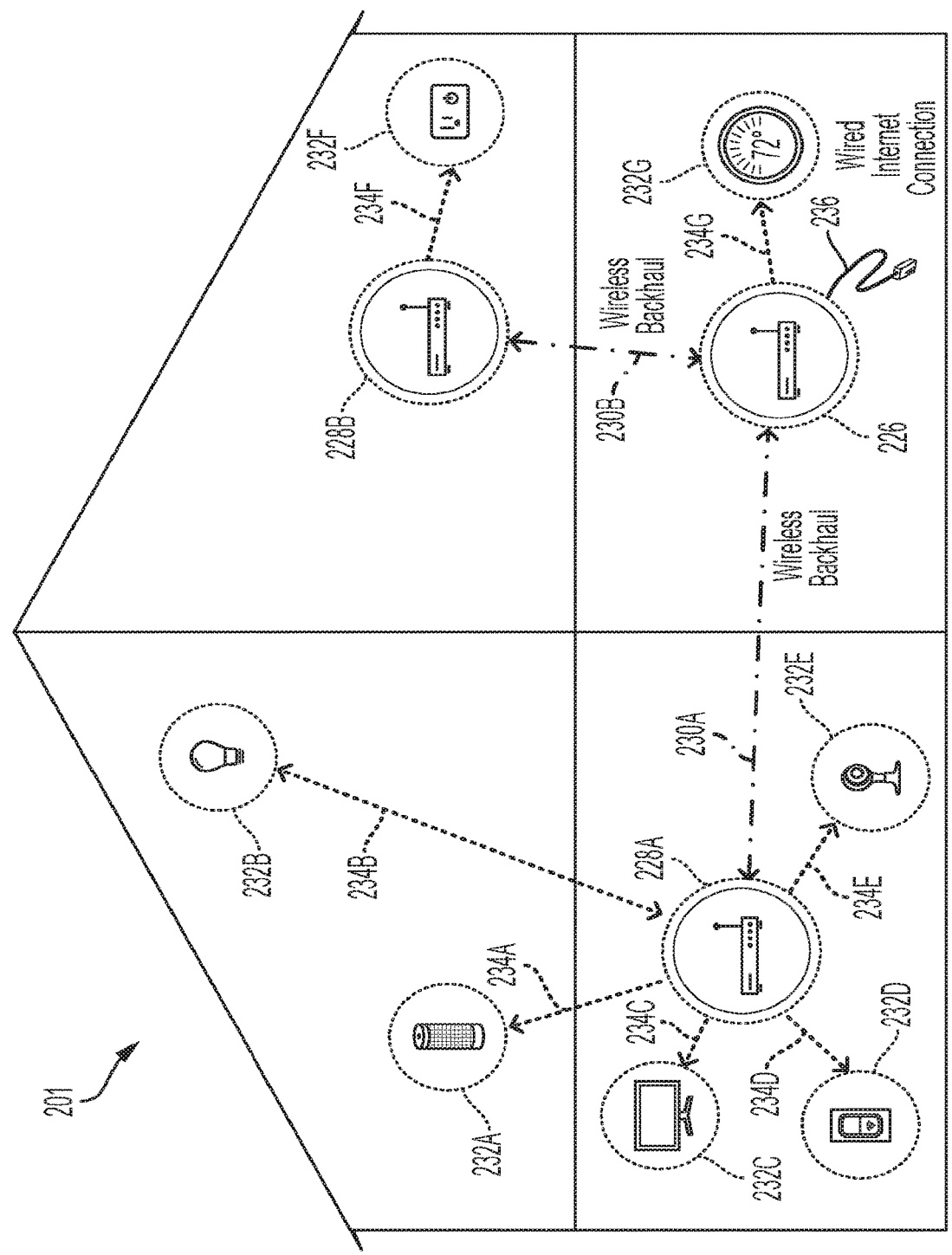
FIG. 2C is a diagram of an example wireless sensing system operating to detect motion in a space.

FIG. 2C is a diagram showing an example wireless sensing system operating to detect motion in a space 201. The example space 201 shown in FIG. 2C is a home that includes multiple distinct spatial regions or zones. In the example shown, the wireless motion detection system uses a multi-AP home network topology (e.g., mesh network or a Self-Organizing-Network (SON)), which includes three access points (APs): a central access point 226 and two extension access points 228A, 228B. In a typical multi-AP home network, each AP typically supports multiple bands (2.4G, 5G, 6G), and multiple bands may be enabled at the same time. Each AP may use a different Wi-Fi channel to serve its clients, as this may allow for better spectrum efficiency.

In the example shown in FIG. 2C, the wireless communication network includes a central access point 226. In a multi-AP home Wi-Fi network, one AP may be denoted as the central AP. This selection, which is often managed by manufacturer software running on each AP, is typically the AP that has a wired Internet connection 236. The other APs 228A, 228B connect to the central AP 226 wirelessly, through respective wireless backhaul connections 230A, 230B. The central AP 226 may select a wireless channel different from the extension APs to serve its connected clients.

In the example shown in FIG. 2C, the extension APs 228A, 228B extend the range of the central AP 226, by allowing devices to connect to a potentially closer AP or different channel. The end user need not be aware of which AP the device has connected to, as all services and connectivity would generally be identical. In addition to serving all connected clients, the extension APs 228A, 228B connect to the central AP 226 using the wireless backhaul connections 230A, 230B to move network traffic between other APs and provide a gateway to the Internet. Each extension AP 228A, 228B may select a different channel to serve its connected clients.

In the example shown in FIG. 2C, client devices (e.g., Wi-Fi client devices) 232A, 232B, 232C, 232D, 232E, 232F, 232G are associated with either the central AP 226 or one of the extension APs 228 using a respective wireless link 234A, 234B, 234C, 234D, 234E, 234F, 234G. The client devices 232 that connect to the multi-AP network may operate as leaf nodes in the multi-AP network. In some implementations, the client devices 232 may include wireless-enabled devices (e.g., mobile devices, a smartphone, a smart watch, a tablet, a laptop computer, a smart thermostat, a wireless-enabled camera, a smart TV, a wireless-enabled speaker, a wireless-enabled power socket, etc.).

When the client devices 232 seek to connect to and associate with their respective APs 226, 228, the client devices 232 may go through an authentication and association phase with their respective APs 226, 228. Among other things, the association phase assigns address information (e.g., an association ID or another type of unique identifier) to each of the client devices 232. For example, within the IEEE 802.11 family of standards for Wi-Fi, each of the client devices 232 may identify itself using a unique address (e.g., a 48-bit address, an example being the MAC address), although the client devices 232 may be identified using other types of identifiers embedded within one or more fields of a message. The address information (e.g., MAC address or another type of unique identifier) can be either hardcoded and fixed, or randomly generated according to the network address rules at the start of the association process. Once the client devices 232 have associated to their respective APs 226, 228, their respective address information may remain fixed. Subsequently, a transmission by the APs 226, 228 or the client devices 232 typically includes the address information (e.g., MAC address) of the transmitting wireless device and the address information (e.g., MAC address) of the receiving device.

In the example shown in FIG. 2C, the wireless backhaul connections 230A, 230B carry data between the APs and may also be used for motion detection. Each of the wireless backhaul channels (or frequency bands) may be different than the channels (or frequency bands) used for serving the connected Wi-Fi devices.

In the example shown in FIG. 2C, wireless links 234A, 234B, 234C, 234D, 234E, 234F, 234G may include a frequency channel used by the client devices 232A, 232B, 232C, 232D, 232E, 232F, 232G to communicate with their respective APs 226, 228. Each AP may select its own channel independently to serve their respective client devices, and the wireless links 234 may be used for data communications as well as motion detection.

The motion detection system, which may include one or more motion detection or localization processes running on the one or more of the client devices 232 or on one or more of the APs 226, 228, may collect and process data (e.g., channel information) corresponding to local links that are participating in the operation of the wireless sensing system. The motion detection system may be installed as a software or firmware application on the client devices 232 or on the APs 226, 228, or may be part of the operating systems of the client devices 232 or the APs 226, 228.

In some implementations, the APs 226, 228 do not contain motion detection software and are not otherwise configured to perform motion detection in the space 201. Instead, in such implementations, the operations of the motion detection system are executed on one or more of the client devices 232. In some implementations, the channel information may be obtained by the client devices 232 by receiving wireless signals from the APs 226, 228 (or possibly from other client devices 232) and processing the wireless signal to obtain the channel information. For example, the motion detection system running on the client devices 232 may have access to channel information provided by the client device's radio firmware (e.g., Wi-Fi radio firmware) so that channel information may be collected and processed.

In some implementations, the client devices 232 send a request to their corresponding AP 226, 228 to transmit wireless signals that can be used by the client device as motion probes to detect motion of objects in the space 201. The request sent to the corresponding AP 226, 228 may be a null data packet frame, a beamforming request, a ping, standard data traffic, or a combination thereof. In some implementations, the client devices 232 are stationary while performing motion detection in the space 201. In other examples, one or more of the client devices 232 may be mobile and may move within the space 201 while performing motion detection.

Mathematically, a signal f(t) transmitted from a wireless communication device (e.g., the wireless communication device 204A in FIGS. 2A and 2B or the APs 226, 228 in FIG. 2C) may be described according to Equation (1):

$$f(t) = \sum_{n=-\infty}^{\infty} c_n e^{j\omega_n t} \quad (1)$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \quad (2)$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k$ (t) from all paths to the wireless communication device, which is shown in Equation (3):

$$R = \sum_{k} r_k(t) \quad (3)$$

Substituting Equation (2) into Equation (3) renders the following Equation (4):

$$R = \sum_{k} \sum_{n=-\infty}^{\infty} (\alpha_{n,k} e^{j\phi_{n,k}}) c_n e^{j\omega_n t} \quad (4)$$

The received signal R at a wireless communication device (e.g., the wireless communication devices 204B, 204C in FIGS. 2A and 2B or the client devices 232 in FIG. 2C) can then be analyzed (e.g., using one or more motion detection algorithms) to detect motion. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $Y_n$ may be represented as follows in Equation (5):

$$Y_n = \sum_{k} c_n \alpha_{n,k} e^{j\phi_{n,k}}. \quad (5)$$

The complex value $Y_n$ for a given frequency component $\omega_n$ indicates a relative magnitude and phase offset of the received signal at that frequency component $\omega_n$. The signal f(t) may be repeatedly transmitted within a time period, and the complex value $Y_n$ can be obtained for each transmitted signal f(t). When an object moves in the space, the complex value $Y_n$ changes over the time period due to the channel response $\alpha_{n,k}$ of the space changing. Accordingly, a change detected in the channel response (and thus, the complex value $Y_n$) can be indicative of motion of an object within the communication channel. Conversely, a stable channel response may indicate lack of motion. Thus, in some implementations, the complex values $Y_n$ for each of multiple devices in a wireless network can be processed to detect whether motion has occurred in a space traversed by the transmitted signals f(t). The channel response can be expressed in either the time-domain or frequency-domain, and the Fourier-Transform or Inverse-Fourier-Transform can be used to switch between the time-domain expression of the channel response and the frequency-domain expression of the channel response.

In another aspect of FIGS. 2A, 2B, 2C, beamforming state information may be used to detect whether motion has occurred in a space traversed by the transmitted signals f(t). For example, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. In some instances, changes to the steering or feedback properties used in the beamforming process indicate changes, which may be caused by moving objects in the space accessed by the wireless signals. For example, motion may be detected by identifying substantial changes in the communication channel, e.g. as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these beamforming matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

In some implementations, the output of the motion detection system may be provided as a notification for graphical display on a user interface on a user device. In some implementations, the user device is the device used to detect motion, a user device of a caregiver or emergency contact designated to an individual in the space 200, 201, or any other user device that is communicatively coupled to the motion detection system to receive notifications from the motion detection system.

In some instances, the graphical display includes a plot of motion data indicating a degree of motion detected by the motion detection system for each time point in a series of time points. The graphical display can display the relative degree of motion detected by each node of the motion detection system. The graphical display can help the user determine an appropriate action to take in response to the motion detection event, correlate the motion detection event with the user's observation or knowledge, determine whether the motion detection event was true or false, etc.

In some implementations, the output of the motion detection system may be provided in real-time (e.g., to an end user). Additionally or alternatively, the output of the motion detection system may be stored (e.g., locally on the wireless communication devices 204, client devices 232, the APs 226, 228, or on a cloud-based storage service) and analyzed to reveal statistical information over a time frame (e.g., hours, days, or months). An example where the output of the motion detection system may be stored and analyzed to reveal statistical information over a time frame is in health monitoring, vital sign monitoring, sleep monitoring, etc. In some implementations, an alert (e.g., a notification, an audio alert, or a video alert) may be provided based on the output of the motion detection system. For example, a motion detection event may be communicated to another device or system (e.g., a security system or a control center), a designated caregiver, or a designated emergency contact based on the output of the motion detection system.

In some implementations, a wireless motion detection system can detect motion by analyzing components of wireless signals that are specified by a wireless communication standard. For example, a motion detection system may analyze standard headers of wireless signals exchanged in a wireless communication network. One such example is the IEEE 802.11ax standard, which is also known as "Wi-Fi 6." A draft of the IEEE 802.11ax standard is published in a document entitled "P802.11ax/D4.0, IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN," March 2019, which is accessible at https://ieeexplore.ieee.org/document/8672643 and hereby incorporated by reference in its entirety. Standard headers specified by other types of wireless communication standards may be used for motion detection in some cases.

In some implementations, a motion detection algorithm used by a wireless motion detection system utilizes a channel response (an output of a channel estimation process) computed by a wireless receiver (e.g., a Wi-Fi receiver). For example, the channel responses computed by a channel estimation process according to a Wi-Fi 6 standard may be received as inputs to the motion detection algorithm. The channel estimation in the Wi-Fi 6 standard occurs at the PHY layer, using the PHY Frame (the PHY Frame is also called a PPDU) of the received wireless signal.

In some examples, a motion detection algorithm employed by a wireless motion detection system uses channel responses computed from orthogonal frequency-division multiplexing (OFDM)-based PHY frames (including those produced by the Wi-Fi 6 standard). The OFDM-based PHY frames can, in some instances, be frequency-domain signals having multiple fields, each having a corresponding frequency-domain signal. With this class of OFDM-based PHY frames, there are typically two types of PPDU fields that allow the Wi-Fi receiver to estimate the channel. The first is the Legacy-Training-Field, and the second are the MIMO-Training-Fields. Either or both fields may be used for motion detection. An example of a MIMO-Training-Field that may be used is the so-called "High-Efficiency Long Training Field" known as HE-PHY (e.g., in the Wi-Fi 6 standard, according to the IEEE 802.11ax standard).

Figure 3:
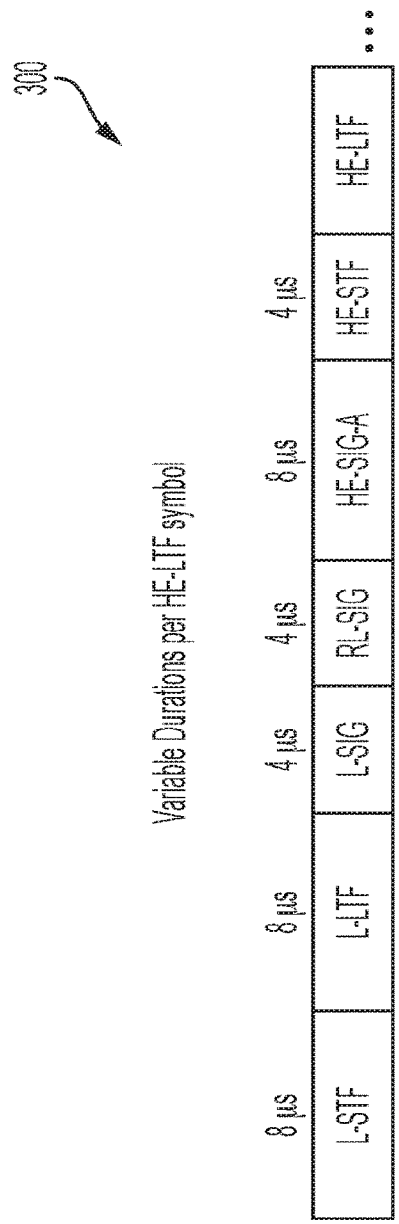
FIG. 3 is a diagram showing an example PHY frame.

FIG. 3 shows an example PHY Frame 300 that includes an HE-LTF. The example PHY Frame 300 shown in FIG. 3 is from the IEEE 802.11ax standard. These and other types of PHY frames that include an HE-LTF may be used for motion detection in some cases. As shown in FIG. 3, the example PHY Frame 300 includes a number of fields that are defined in the 802.11 standard: L-STF (Legacy Short Training Field), L-LTF (Legacy Long Training Field), L-SIG (Legacy Signal), RL-SIG (Repeated Legacy Signal), HE-SIG-A (High-Efficiency Signal), HE-STF (High-Efficiency Short Training Field), multiple HE-LTFs, Data, PE (Packet Extension). In some instances, the L-LTF field can be used to estimate channel responses that can be provided as input to a motion detection algorithm. The HE-LTF fields, which are provided as MIMO Training Fields, can also be used to estimate channel responses that can be provided as input to a motion detection algorithm.

In the example shown in FIG. 3, the HE-LTFs can have variable duration and bandwidths, and in some examples the PHY Frame 300 breaks a 20 MHz channel into 256 frequency points (instead of 64 used by previous PHY Frame versions). As such, the example HE-LTFs in the PHY Frame 300 may provide four times better frequency resolution (e.g., compared to earlier PHY frame versions), as each point represents a frequency bandwidth of 78.125 kHz instead of 312.5 kHz. Also, the HE-LTF provides more continuous subcarriers than other fields, and hence a wider continuous bandwidth can be used for motion detection. For instance, Table I (below) shows the continuous bandwidths and frequency resolution for the HE-LTF field (labeled "HE" in the table) compared to Legacy PHY fields (L-STF and L-LTF) and other MIMO Training Fields (e.g., High-Throughput (HT) Long Training Field and Very-High-Throughput (VHT) Long Training Field).

TABLE I

| Bandwidth | Continuous HE Subcarriers | Continuous HE Bandwidth | Continuous Legacy Bandwidth | Continuous HT/VHT Bandwidth |
|---|---|---|---|---|
| 20 MHz | 121 | 9.453 MHz (121 * 78.125 kHz) | 8.125 MHz (26 Subcarriers) | 8.750 MHz (28 Subcarriers) |
| 40 MHz | 242 | 18.91 MHz (242 * 78.125 kHz) | 8.125 MHz (26 Subcarriers) | 17.8125 MHz (56 Subcarriers) |
| 80 MHz | 498 | 38.91 MHz (498 * 78.125 kHz) | 8.125 MHz (26 Subcarriers) | 17.8125 MHz (56 Subcarriers) |
| 160 MHz | 498 | 38.91 MHz (498 * 78.125 kHz) | 8.125 MHz (26 Subcarriers) | 17.8125 MHz (56 Subcarriers) |

In some IEEE 802.11 standards, the PHY layer is broken into 2 sub-layers: the PLCP Sublayer (Physical Layer Convergence Procedure), and the PMD Sublayer (PHY Medium Dependant). The PLCP Sublayer (Physical Layer Convergence Procedure) takes data from the MAC layer and translates it into a PHY frame format. The format of the PHY frame is also referred to as a PPDU (PLCP Protocol Data Unit). A PPDU may include fields that are used for channel estimation. The PMD Sublayer (PHY Medium Dependant) provides a modulation scheme for the PHY layer. There are many different IEEE 802.11 based PHY frame formats defined. In some examples, a wireless motion detection system uses information derived from OFDM based PHY frames, such as, for example, those described in the following standard documents: IEEE 802.11a-1999: Legacy OFDM PHY; IEEE 802.11n-2009: HT PHY (High-Throughput); IEEE 802.11ac-2013: VHT PHY (Very-High-Throughput); IEEE 802.11ax (Draft 4.0, March 2019): HE PHY (High-Efficiency).

Other types of PHY layer data may be used, and each PHY layer specification may provide its own PPDU format. For instance, the PPDU format for a PHY layer specification may be found in some IEEE 802.11 standards under the section heading "<XXX> PHY Specification"==>"<XXX> PHY"==>"<XXX> PPDU Format". The example PHY frame 300 shown in FIG. 3 is an HE PHY frame provided by an ODFM PHY layer of an example 802.11 standard.

In some IEEE 802.11 standards (e.g., IEEE 802.11a-1999), the OFDM PHY divides a 20 MHz channel into 64 frequency bins. Modulation and Demodulation is done using 64-point complex inverse Fast Fourier Transform (IFFT) and Fast Fourier Transform (FFT). In an example modulation process: data bits grouped (e.g., depending on QAM constellation), each group of bits is assigned to one of the subcarriers (or frequency bins); depending on QAM constellation, group of bits mapped to a complex number for each subcarrier; and a 64-point IFFT is performed to generate complex-time-domain I and Q waveforms for transmission. In an example demodulation process: complex I and Q time domain signals are received; a 64-point FFT is performed to compute complex number for each subcarrier; depending on QAM constellation, each subcarrier complex number is mapped to bits; and bits from each subcarrier are re-assembled into data. In a typical modulation or demodulation process, not all 64 subcarriers are used; for example, only 52 of the subcarriers may be considered valid for data and pilot, and the rest of the subcarriers may be considered NULLED. The PHY layer specifications in more recently-developed IEEE 802.11 standards utilize larger channel bandwidths (e.g., 40 MHz, 80 MHz, and 160 MHz).

Figure 4:
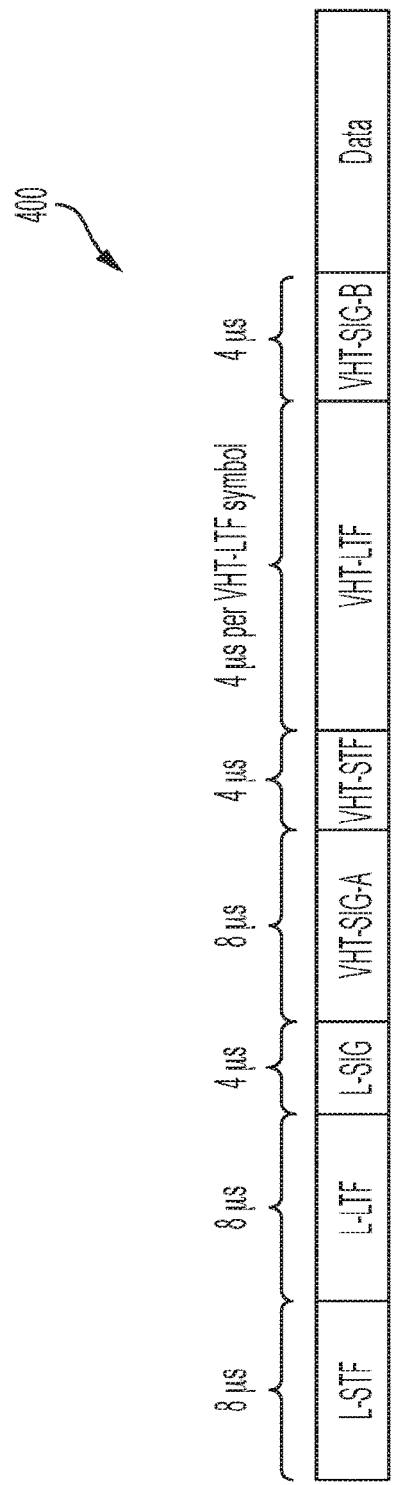
FIG. 4 is a diagram showing an example PHY frame.

FIG. 4 shows an example PHY Frame 400 that includes a Very High Throughput Long Training Field (also referred to as "VHT-LTF"). The example PHY Frame 400 shown in FIG. 4 is from the IEEE 802.11ac standard. A draft of the IEEE 802.11ac standard is published in a document entitled "802.11ac-2013—IEEE Standard for Information technology—Telecommunications and information exchange between systems-Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz," December 2018, which is accessible at https://ieeexplore.ieee.org/document/7797535 and hereby incorporated by reference in its entirety. These and other types of PHY frames that include a VHT-LTF may be used for motion detection in some cases.

Figure 5:
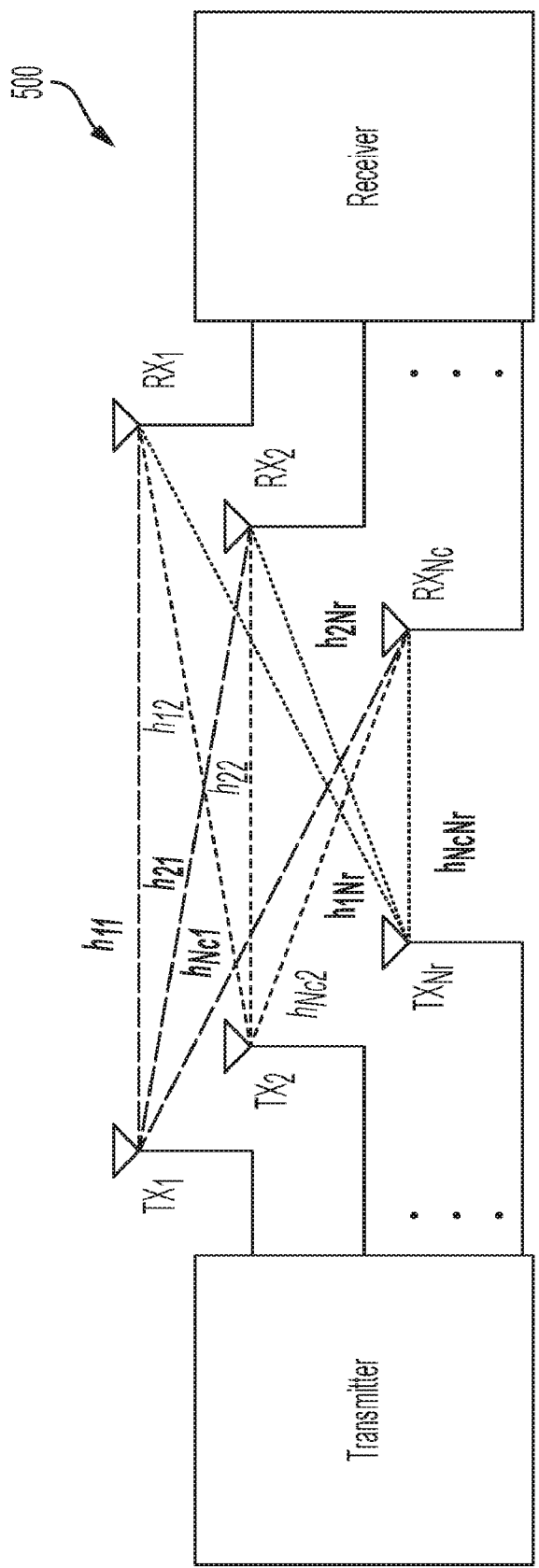
FIG. 5 is a diagram showing an example multiple-input-multiple-output (MIMO) radio configuration.

As shown in FIG. 4, the example PHY Frame 400 includes a number of components that are defined in the 802.11 standard: L-STF, L-LTF, L-SIG, VHT-SIG-A (Very-High-Throughput Signal A), VHT-STF (Very-High-Throughput Short Training Field), VHT-LTF (Very-High-Throughput Long Training Field), VHT-SIG-B (Very-High-Throughput Signal B), Data. The PPDU for Legacy, HT, VHT, and HE PHYs begin with a Legacy Preamble which includes the L-STF and the L-LTF, as shown in the example PHY frame 400 in FIG. 4. The L-LTF can be used for channel estimation in some cases. The VHT-LTF, which has a wider bandwidth compared to the L-LTF and contains similar information, can be used for MIMO channel estimation. The HT-LTF and VHT-LTF are very similar, except that the VHT-LTF allows higher order MIMO and allows 80 MHz and 160 MHz channels. These fields are beneficial to use for motion detection because they can provide wider continuous bandwidth and MIMO channel information. With MIMO channel estimation, there are generally Nr×Nc channel responses computed. This provides more information with benefit to motion detection. FIG. 5 shows an example MIMO device configuration 500 including a transmitter having Nr antennas and a receiver having Nc antennas. In the example of FIG. 5, Nr×Nc channel responses may be computed based on the HE-LTF or the VHT-LTF or another MIMO training component of a PHY frame.

In some implementations, a wireless communication device computes a channel response, for example, by performing a channel estimation process based on a PHY frame. For instance, a wireless communication device may perform channel estimation based on the example PHY frame 300 shown in FIG. 3, the example PHY frame 400 shown in FIG. 4, or another type of PHY frame from a wireless signal.

In some instances, the channel information used for motion detection may include a channel response generated by channel estimation based on the L-LTF in the PHY frame. The L-LTF in the 802.11ax standard can be equivalent to the LTF in the IEEE 802.11a—1999 standard. The L-LTF may be provided in the frequency domain as an input to a 64-point IFFT. Typically, only 52 of the 64 points are considered valid points for channel estimation; and the remaining points (points [−32, −26) and (26, 31]) are zero. As described in the IEEE 802.11a—1999 standard, the L-LTF may be a long OFDM training symbol including 53 subcarriers (including a zero value at DC), which are modulated by the elements of a sequence L given by the following:

$$L_{-26,26} = \{1,1,-1,-1,1,1,-1,1,-1,1,1,1,1,1,1,1,1,-1,-1,\\1,1,-1,1,-1,1,1,1,1,0,1,-1,-1,1,1,-1,1,-1,1,-1,\\1,-1,-1,-1,1,1,1,-1,-1,1,1,-1,1,1,1,1,1\}$$

The example "L" vector shown above represents the complex frequency-domain representation of the field at baseband (centered around DC) and is described in page 13 of a draft of the IEEE 802.11a—1999 standard. The draft of the IEEE 802.11a—1999 standard is published in a document entitled "802.11a-1999—IEEE Standard for Telecommunications and Information Exchange Between Systems—LAN/MAN Specific Requirements—Part 11: Wireless Medium Access Control (MAC) and physical layer (PHY) specifications: High Speed Physical Layer in the 5 GHz band" and accessible at https://ieeexplore.ieee.org/document/815305. The example "L" vector is considered "Legacy", as it was part of the original OFDM PHY specification, and is considered part of the legacy preamble. Hence in later specification versions, it is referred to as the L-LTF (for Legacy-Long Training Field).

In some instances, the channel information used for motion detection may include a channel response generated by channel estimation based on one or more of the MIMO training fields in the PHY frame (e.g., the HE-LTF, HT-LTF, or VHT-LTF fields). The HE-LTF may be provided in the frequency domain as an input to a 256-point IFFT. With a typical HE-LTF, there are 241 valid points (e.g., instead of 52 as in the legacy case). Each point in the HE-LTF represents a frequency range of 78.125 kHz, whereas each Legacy point represents a larger frequency range of 312.5 kHz. Therefore, the HE-LTF may provide higher frequency resolution, more frequency domain data points, and a larger frequency bandwidth, which can provide more accurate and higher-resolution (e.g., higher temporal and spatial resolution) motion detection. An example HE-LTF is described on page 561 of the draft of the IEEE 802.11ax standard as follows:

In a 20 MHz transmission, the 4×HE-LTF sequence transmitted on subcarriers [−122: 122] is given by Equation (27-42).

$$HELTF_{-122,122} = \qquad (27\text{-}42)$$

{−1, −1, +1, −1, +1, −1, +1, +1, +1, −1, +1, +1, +1, −1,

−1, +1, −1, −1, −1, −1, −1, +1, +1, −1, −1, −1, −1, +1,

+1, −1, +1, −1, +1, +1, +1, +1, −1, +1, −1, −1, +1, +1,

−1, +1, +1, +1, +1, −1, −1, +1, −1, −1, −1, +1, +1, +1,

+1, −1, +1, +1, −1, −1, −1, +1, −1, −1, +1, +1, +1, −1,

+1, −1, −1, −1, −1, +1, −1, +1, −1, −1, −1, −1, −1,

−1, +1, +1, −1, −1, −1, −1, −1, +1, −1, −1, +1, +1,

+1, −1, +1, +1, +1, −1, +1, −1, +1, −1, −1, −1, −1,

−1, +1, +1, +1, −1, −1, −1, +1, −1, +1, +1, +1, 0, 0,

0, −1, +1, −1, +1, −1, +1, +1, −1, +1, +1, +1, −1, −1,

+1, −1, −1, +1, −1, +1, −1, +1, +1, +1, −1, +1, +1, +1,

−1, −1, +1, −1, −1, −1, −1, −1, +1, +1, −1, −1, −1, −1,

−1, −1, +1, −1, +1, −1, −1, −1, +1, −1, +1, +1, −1,

−1, +1, −1, −1, −1, −1, +1, +1, −1, +1, +1, +1, +1,

+1, +1, +1, −1, +1, +1, −1, −1, −1, −1, +1, −1, −1,

+1, +1, −1, +1, −1, −1, −1, −1, +1, −1, +1, −1, −1, +1,

+1, +1, +1, −1, −1, +1, +1, +1, +1, +1, −1, +1, +1,

−1, −1, −1, +1, −1, −1, −1, +1, −1, +1, −1, +1, +1}

Figure 6:
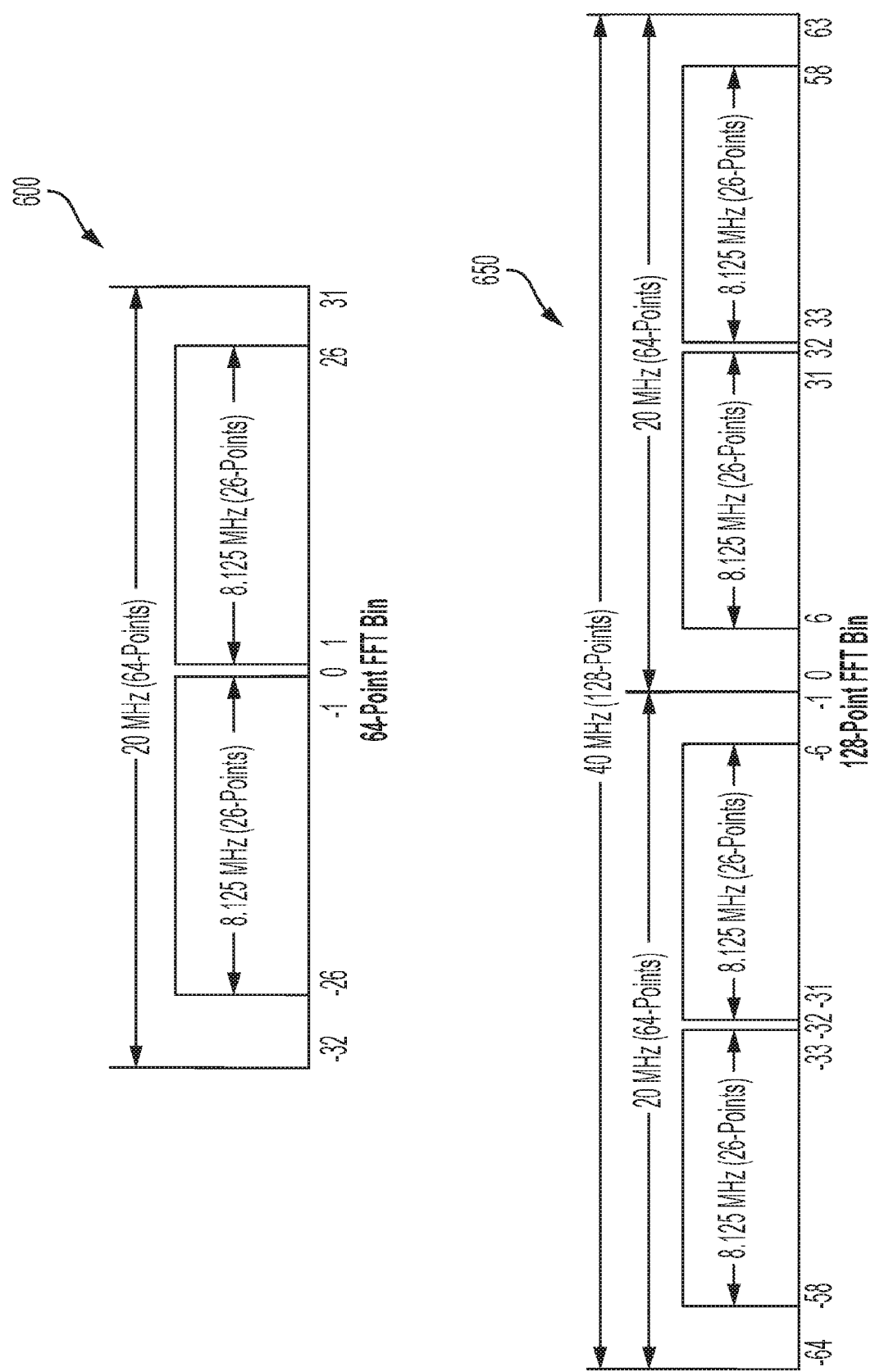
FIG. 6 is a diagram showing example frequency spectra of wireless signals.

In some instances, a channel response can be estimated on a receiver device by performing an FFT of the received time-domain sequence (e.g., the example L-LTF and HE-LTF sequences shown above), and dividing by the expected result [CH(N)=RX(N)/L(N)]. The 64-Point FFT Bin 600 in the top portion of FIG. 6 shows the resulting spectrum that can be measured (20 MHz and 40 MHz channels) from the L-LTF in an example PHY frame. The 128-Point FFT Bin 650 in the bottom portion of FIG. 6 shows the resulting spectrum that can be measured for the same 20 MHz channels from the HE-LTF in an example PHY frame. As shown in FIG. 6, the HE-LTF may provide higher frequency resolution (more points in the same frequency bandwidth), a higher number of frequency domain data points (more bins), and a larger frequency bandwidth.

In some aspects of what is described here, messages initiated by protocols in higher layers (e.g., layers above Layers 1 and 2 of the OSI model) may be used to elicit MIMO transmissions from wireless communication devices. The MIMO wireless signal can be used for motion detection or another type of wireless sensing application. In some implementations, the MIMO wireless signal includes a MIMO training field that can be used for motion detection.

In some aspects, the HT-LTF, VHT-LTF or HE-LTF field in a PHY frame of a wireless transmission according to an IEEE Wi-Fi standard may be used for motion detection. Such wireless signals may be transmitted through a space over a time period, for example, from one wireless communication device to another. A MIMO training field (e.g., the HT-LTF, VHT-LTF or HE-LTF field) may be identified in the PHY frame of each wireless signal, and channel information may be generated based on the respective MIMO training fields. The channel information may then be used for wireless sensing (e.g., to detect motion of an object, to detect breathing, to detect gestures, etc.) of the space during the time period.

Figure 7:
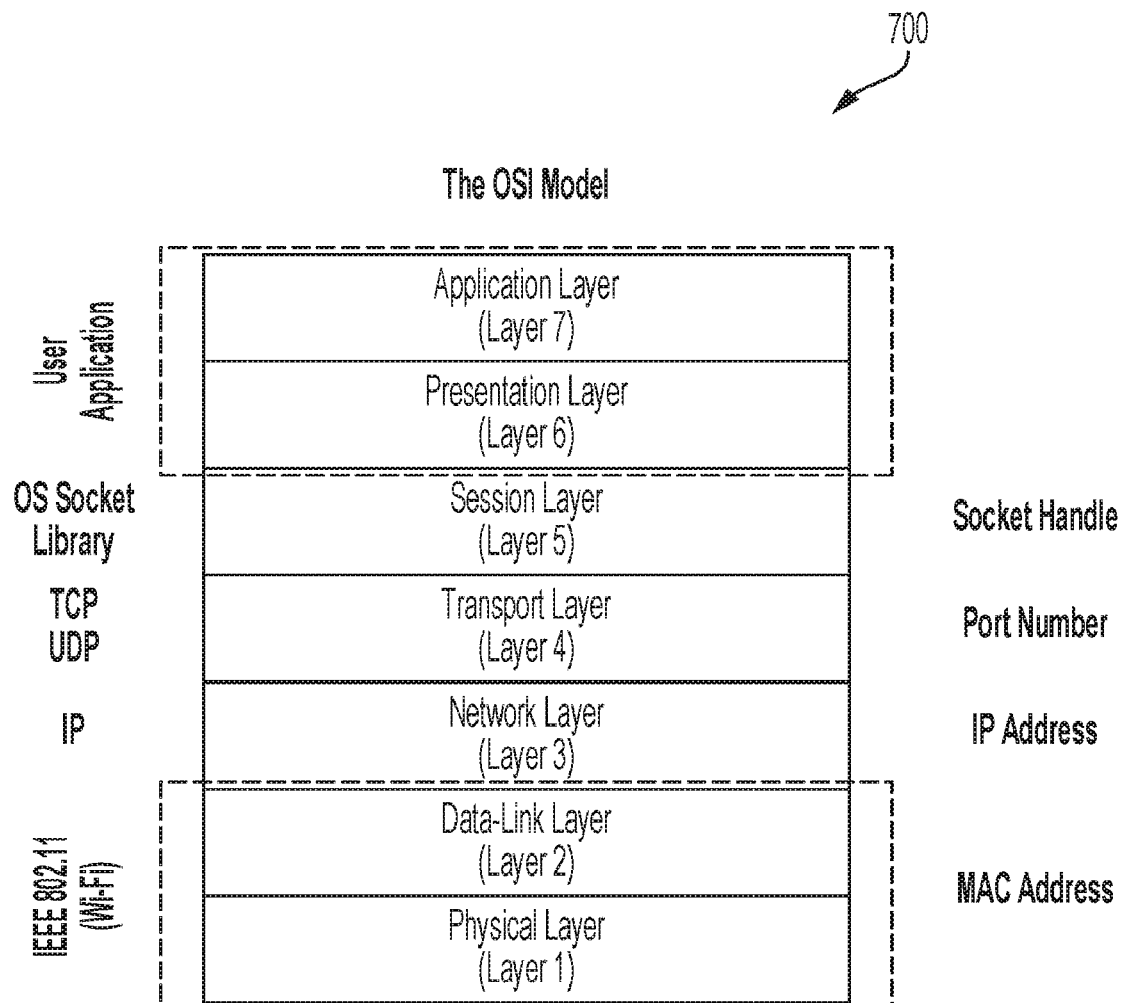
FIG. 7 is a diagram showing an example representation of the Open System Interconnection (OSI) model.

FIG. 7 is a diagram showing a typical representation of the Open System Interconnection (OSI) model 700. As shown in FIG. 7, the typical OSI networking model defines seven layers: (Layer 1) the physical layer, (Layer 2) the data link layer, (Layer 3) the network layer, (Layer 4) the transport layer, (Layer 5) the session layer, (Layer 6) the presentation layer, (Layer 7) the application layer. A networking model may define additional or different layers in some cases.

As shown in FIG. 7, each of the OSI layers provides specified functionality and defines specified data objects. A user application (e.g., operating in Layer 6 and/or Layer 7) operating on a device can communicate using the standard network features represented in the OSI model 700; the user application may initiate such communication by interacting with the operating system (OS) socket library in the session layer. As shown in FIG. 7, the OS socket library exists in Layer 5, and due to standardization has virtually the same API on all modern operating systems (e.g., Linux, Windows, Android, OSX, etc). Each session may be identified by a "socket handle" that is returned to the user application by the operating system, and the user application may use the socket handle when interacting with the Socket API.

In the example OSI model 700 shown in FIG. 7, the transport layer (Layer 4) defines a way for multiple applications to talk to each other. There are many transport layer protocols used; the most common are: TCP (Transmission Control Protocol), and UDP (User Datagram Protocol). Applications can select, via the socket API, which protocol to use for communication. Transport layer messages and the corresponding contents are identified by a "port number," which is typically is a 16-bit value. Many standardized applications have dedicated port numbers; for example, a web server typically communicates on port 80, and the OS Socket Library knows to pass data received on port 80 to the socket handle belonging to the web server.

In the example OSI model 700 shown in FIG. 7, below the transport layer (Layer 4) is the network layer (Layer 3). The network layer provides Internet Protocol (IP) resources, which primarily allow grouping of multiple devices into a logical network. Network layer services generally allow for identification of both logical network and physical device, as well as providing mechanisms for different networks to communicate with each other (typically referred to as routing). For example, the network layer may include Internet Protocol version 4 (IPv4), Internet Protocol version 6 (IPv6) or another IP version. The Internet Protocol (IP) may serve as the communications protocol for relaying data between devices and across network boundaries (e.g., over the Internet). In some examples, each device is identified by a logical 32-bit address (e.g., in IPv4), or a 128-bit address (e.g., IPv6) in the network layer. Both an IPv4 and IPv6 address contain a network portion, and a device portion, which is determined based on standardized criteria.

In the example OSI model 700 shown in FIG. 7, below the network layer (Layer 3) is the data link layer (Layer 2) and the physical layer (Layer 1). The data link layer (also known as the MAC layer) handles coordinating how multiple devices communicate using a shared media (e.g., a shared wireless channel for Wi-Fi, or another form of shared media). In the MAC layer, each device is identified by a 48-bit MAC address. In Wi-Fi networks, the network layer and the data link layer are defined by the IEEE 802.11 standards. The physical layer generates PHY frames for communication between devices.

In some systems, a motion detection algorithm employed by a wireless motion detection system uses channel responses computed from orthogonal frequency-division multiplexing (OFDM)-based PHY frames (including those defined by IEEE 802.11 standards for Wi-Fi networks). For OFDM modulation, Wi-Fi signals contain multiple fields that can be used to compute a channel estimation or response. First, there is the Legacy-LTF (Long Training Field), which is generally present on every Wi-Fi message. Second, there are the MIMO LTF's (HT-LTF, VHT-LTF, HE-LTF). For devices which support HE/VHT/HE modes, the MIMO fields are typically present for longer transmissions, and they consume airtime and can decrease the efficiency for short transmissions.

In some instances, for the motion detection system to measure the channel response, a client/leaf device needs to transmit a wireless message (e.g., a message addressed to an access point or another device in the Wi-Fi network). The IEEE 802.11 MAC layer standard contains a defined mechanism that states: if a device receives a data message, the device acknowledges that it was received correctly. This mechanism may provide a form of "sounding"/"illumination", as it allows for a 0 payload length MAC frame (a Null Data Frame) to be sent to any Wi-Fi enabled device, knowing that it will return with an ACK message. In some systems, a limitation of the Null-Data/ACK mechanism is that the standard defines that the ACK must be transmitted using "legacy" mode, as switching to the MIMO mode for a short transmission is not efficient. In such systems, the wireless messages sent according to IEEE 802.11 standards do not provide a MIMO estimation unless the client/leaf device generates a large enough transmission to cause the radio to make use of the MIMO transmission mode.

Although some systems can use the Legacy training fields for motion detection, other systems may not support capturing the Legacy estimation due to hardware or other constraints, and hence only provide the ability to extract the MIMO estimations. Therefore, some systems are limited, in the sense that a higher layer in the OSI model may be required to elicit a MIMO channel estimation, for example, when there is no standardized mechanism in the MAC/PHY layers and the client/leaf does not necessarily support non-standard components. In some instances, utilizing a higher layer in the OSI model may reduce efficiency, for example, if larger data transmission overhead is required to generate a channel estimation.

A motion detection algorithm may also benefit from a MIMO estimation (e.g., relative to a Legacy estimation), as multiple antenna on both transmit and receive side introduce an element of spatial diversity, each illuminating or sensing a slightly different view or perspective of the environment due to the antenna's physical separation. To obtain these and other benefits offered by having a MIMO estimation, a mechanism using standard components within higher layers in the OSI model may be utilized to elicit a MIMO channel estimation in some cases.

In some aspects, the systems and techniques described here provide solutions for using a higher layer in the OSI model to elicit a MIMO channel estimation, for example, using components in the MAC/PHY layer specifications to elicit a client/leaf node to generate a message containing a MIMO training field. The solutions may exploit the fact that the higher layers encapsulate their messages into the payload of MAC/PHY "Data-Frames", which can be transmitted containing the MIMO fields. Hence by eliciting a client/leaf node using existing standard components or protocols within the Network/Transport layers, a MIMO training field can be obtained from that device.

Figure 8:
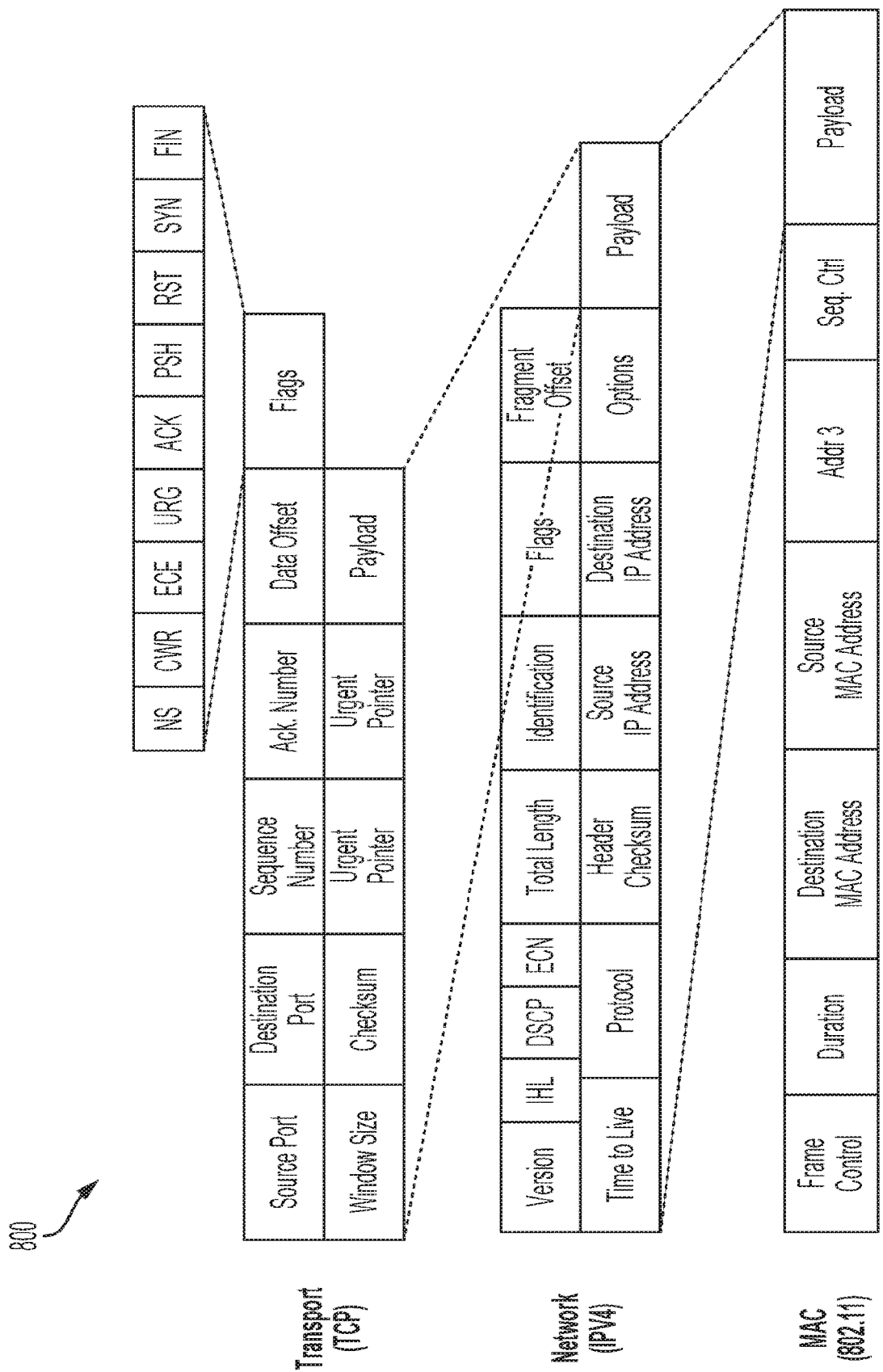
FIG. 8 is a diagram showing example message components for three layers of a typical OSI model.

FIG. 8 is a diagram showing example frame formats for three layers of a typical OSI model. In particular, the diagram in FIG. 8 shows frame formats for TCP messages generated by a transport layer, IPv4 messages generated by a network layer, and 802.11 messages generated by a MAC layer. As represented in FIG. 8, the OSI Model works on the concept of "encapsulation" for transmission of messages, in which data provided from the layer above is "encapsulated" into the payload field of the message. For reception, the opposite occurs. In the example of FIG. 8, data provided in the Network layer is included in the payload field of the message in the MAC layer, and the data provided in the Transport layer is included in the payload field of the message in the Network layer.

In some cases, a wireless communication device can use one or more layers above the MAC layer (e.g., transport layer, network layer, or another layer above the data link layer) to elicit a MIMO transmission from another wireless communication device. For example, an access point (AP) in a wireless network (e.g., a mesh node or another type of AP) may generate and send a network layer message or a transport layer message that causes a client device to send a response using MIMO transmission. The following discussion and the processes shown in FIGS. 9, 10, 11A, 11B, 11C, 12A, 12B, and 13 provide examples of systems and techniques that may be used to initiate or otherwise elicit client data transmission (e.g. MIMO transmission) for motion detection; other systems and techniques may be used in some instances.

In some examples, software-implemented processes can utilize components (in some cases, existing components) in layers above the MAC layer to cause a client/leaf device transmit data. Such process may be used to enable motion detection functionality using the MIMO fields without the need to add or modify or add any software on the client/leaf device.

In some implementations, an address discovery process is used to obtain an address for communication with layers above the MAC layer. For example, channel estimation may be defined at the MAC/PHY layers, and the identification of a client/leaf device may be given by its MAC address (e.g., a 48-bit MAC address). In some instances, for higher layer transmission to a device, knowledge of the device's upper layer logical address (e.g., IP address) may be needed, and an address discovery process can be used to obtain the device's upper layer logical address (e.g., IP address) from its lower layer physical address (e.g., MAC address). At least in some contexts, the operation of obtaining the device's upper layer logical address (e.g., IP address) from its lower layer physical address (e.g., MAC address) requires a different (often more difficult) process than common procedures that obtain the lower layer physical address (e.g., MAC address) given an upper layer logical address (e.g., IP address).

Figure 9:
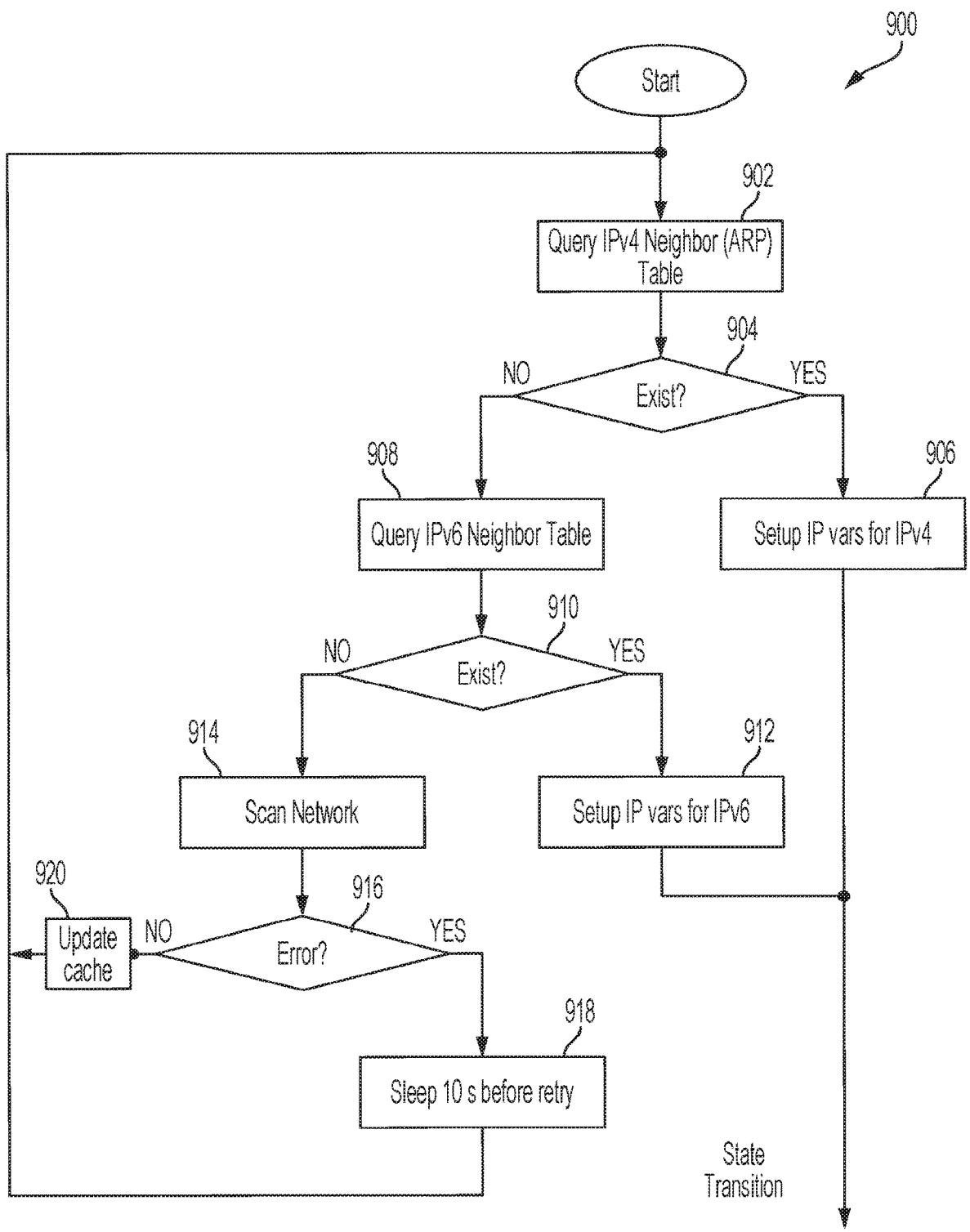
FIG. 9 is a flowchart representing an example process that finds an upper layer logical address.

FIG. 9 is a flow chart representing an example process 900 that finds an upper layer logical address (e.g., an IPv4 address or IPv6 address) from a lower layer physical address (e.g., a MAC address). The process 900 may include additional or different operations, and the operations shown in FIG. 9 may be performed in the order shown or in another order. In some cases, one or more of the operations shown in FIG. 9 are implemented as processes that include multiple operations, sub-processes for other types of routines. In some cases, operations can be combined, performed in another order, performed in parallel, iterated or otherwise repeated or performed in another manner. The process 900 may be performed by the example wireless communication devices 102A, 102B, 102C shown in FIG. 1, by the example wireless communication devices 204A, 204B, 204C shown in FIGS. 2A and 2B, by any of the example devices (e.g., client devices 232 or AP devices 226, 228) shown in FIG. 2C, or by another type of device.

In some instances, the upper layer logical address that is obtained from process 900 may be encapsulated in a payload field of a lower layer message. For example, in implementations where the process 900 is used to obtain a network address, the network address may be encapsulated in the payload field of a MAC layer message (e.g., as seen in FIG. 8). As another example, in implementations where the process 900 is used to obtain a transport layer address, the transport layer address may be encapsulated in the payload field of a network layer message (e.g., as seen in FIG. 8). In some instances, a wireless communication device can create a cache of address mappings. The cache is stored on the wireless communication device and shows the mapping between the lower layer physical address (e.g., MAC address) and the upper layer logical address (e.g., network address). Either the IPv4 protocol or the IPv6 protocols may operate at the network layer, and the process 900 queries the cache (which may contain an IPv4 neighbor table or an IPv6 neighbor table depending on which protocol operates at the network layer) to determine the network address from the lower layer physical address (e.g., the MAC address).

At 902, the cache is queried to determine if it contains an IPv4 neighbor table. In some implementations, the IPv4 neighbor table may also be referred to as the IPv4 Address Resolution Protocol (ARP) table. At 904, the process 900 determines whether the IPv4 neighbor table is stored in the cache. At 906, in response to a determination that the IPv4 neighbor table is stored in the cache, the network address (e.g., the IPv4 address) is obtained from the cache and the internet protocol (IP) variables for the IPv4 address are setup and initialized. As an example, the fields for the network layer packet shown in FIG. 8 are setup and initialized at 906.

At 908, in response to a determination that the IPv4 neighbor table is not stored in the cache, the cache is once again queried to determine if it contains an IPv6 neighbor table. At 910, the process 900 determines whether the IPv6 neighbor table is stored in the cache. At 912, in response to a determination that the IPv6 neighbor table is stored in the cache, the network address (e.g., the IPv6 address) is obtained from the cache and the IP variables for the IPv6 address are setup and initialized.

At 914, in response to a determination that the IPv6 neighbor table is not stored in the cache, the network is scanned. As an example, at 914, the process 900 iterates through the IPv4 and IPv6 link-local addresses to determine if one or more of the IPv4 and IPv6 link-local addresses elicits a response. At 916, the process 900 determines whether an error has occurred. In some instances, an error occurs when the scanning performed at 914 does not elicit any response. At 918, in response to a determination that an error has occurred, a delay for a predetermined time (e.g., in a range from about 5 seconds to about 15 seconds) occurs before the process 900 is iterated from 902. In the example shown in FIG. 9, 10 seconds is depicted as the delay, but another delay may be used in other examples. At 920, in response to a determination that an error has not occurred (e.g., the scanning performed at 914 elicits a response), the cache is updated at 920 to reflect the mapping between the lower layer physical address (e.g., MAC address) and the IPv4 or IPv6 link-local address that provided the response. From 920, the process 900 is iterated from 902.

Figure 11B:
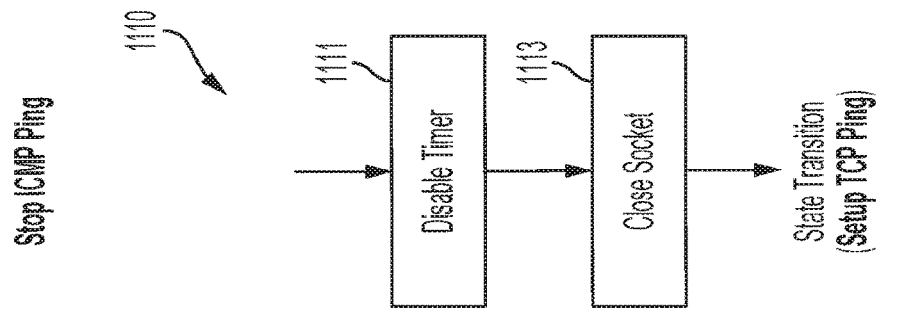
FIG. 11B shows a flowchart representing an example process to stop an ICMP ping.
Figure 11A:
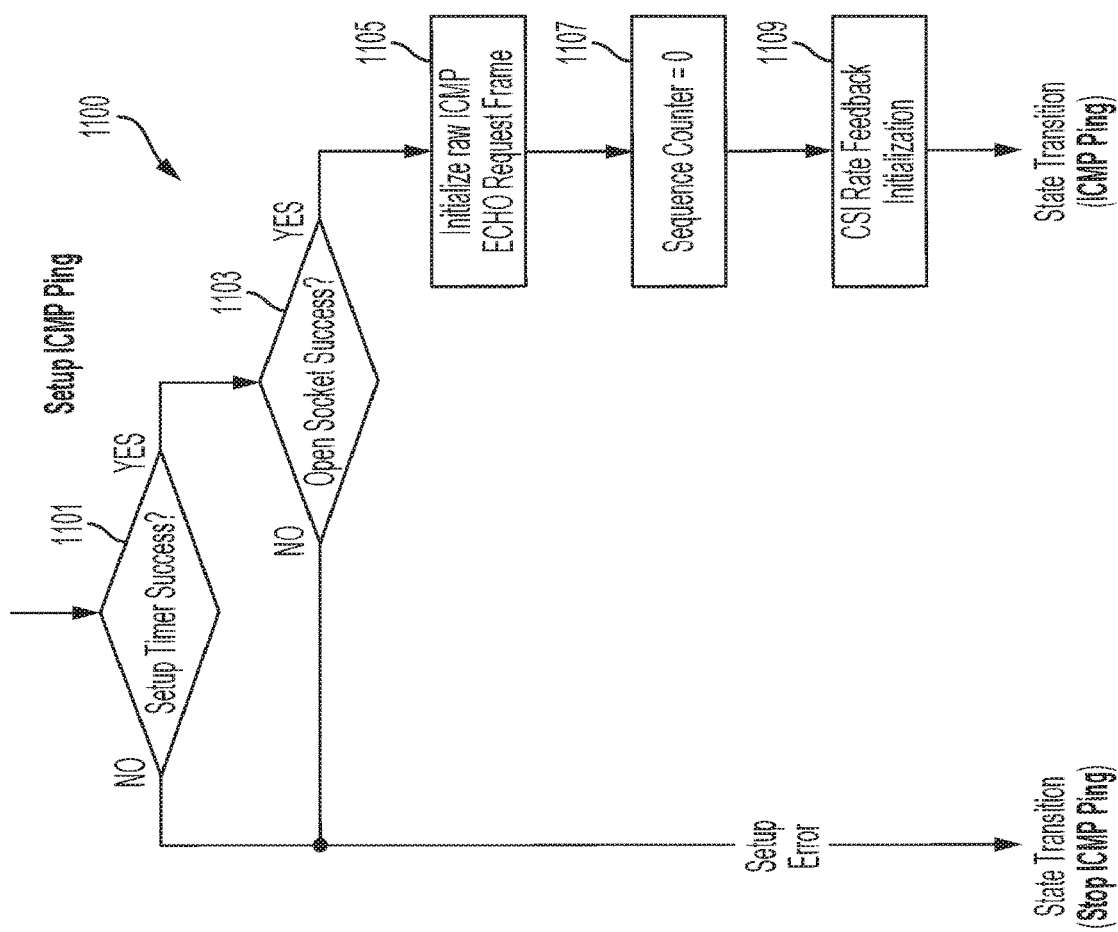
FIG. 11A shows a flowchart representing an example process to setup an ICMP ping.
Figure 11C:
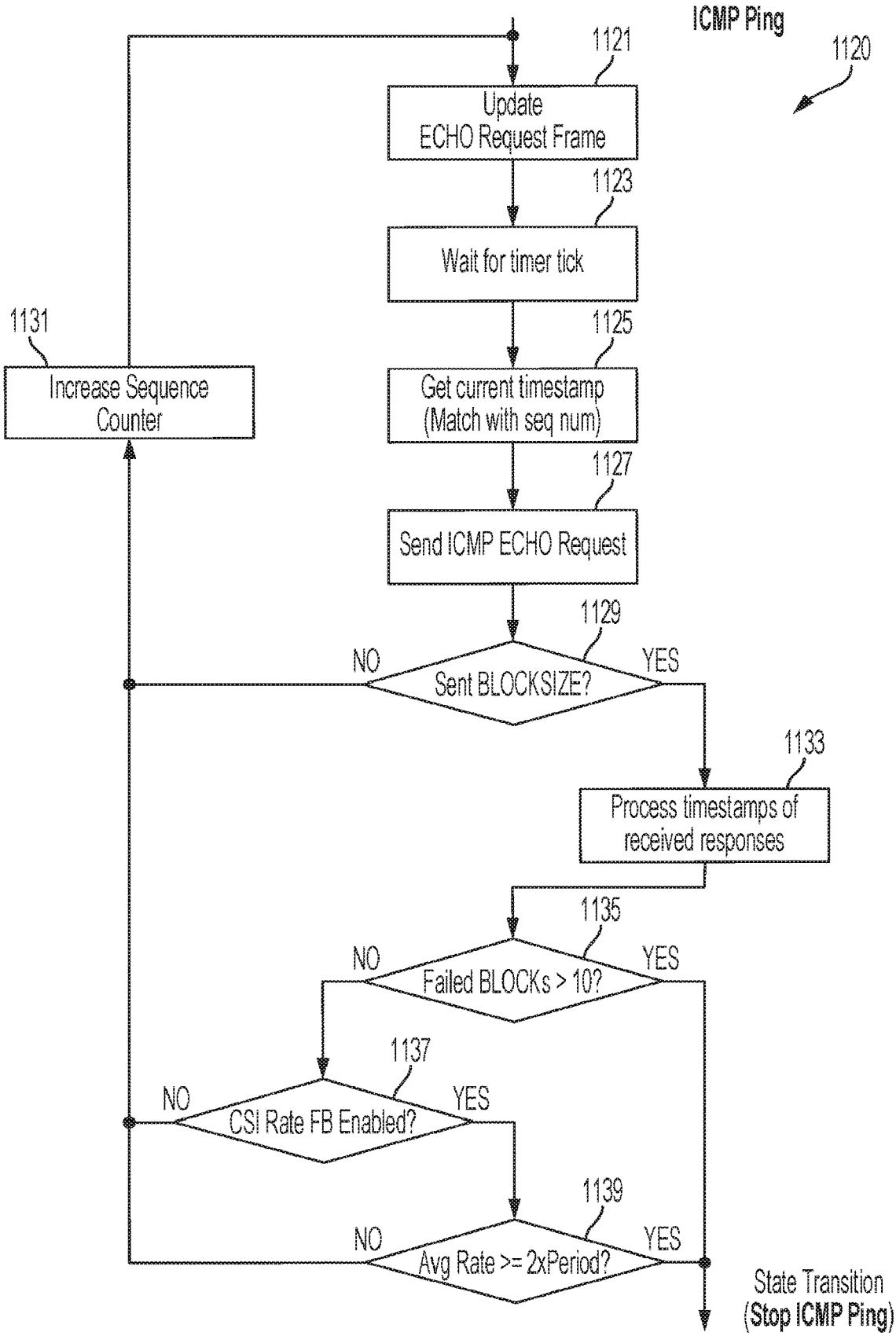
FIG. 11C shows a flowchart representing an example process to conduct an ICMP ping.

One example technique that can be used to elicit a MIMO transmission from a wireless communication device is commonly referred to as an "ICMP Ping". In some cases, an ICMP Ping process is defined in the network layer, and off-the-shelf applications exist to generate such messages (e.g., ping, ping6, fping). The ICMP Ping process may be explicitly defined to provide a response given a request, and may be used for network connectivity troubleshooting or other purposes. The ICMP Ping process may be natively built into the network stack, and may provide a mechanism for causing a client/leaf device produce a data transmission in certain instances. The ICMP Ping may utilize an IPv4, IPv6, or another similar network layer protocol. However, some devices (for security, privacy, or other reasons) disable ICMP. With ICMP disabled, a device which has received a ping message may not generate a response, and hence may not elicit a wireless transmission that can produce a channel response measurement. In some cases, existing ICMP Ping and related processes can be modified to provide advantages for wireless motion detection systems. For example, the ICMP Ping processes shown in FIGS. 11A, 11B, and 11C are tailored for sending periodic requests, may provide a feedback mechanism to ensure received responses, and may provide better data efficiency (e.g., by eliminating padding and unnecessary data inserted by off-the-shelf applications). Another type of ICMP Ping process may be used.

Another example technique that can be used to elicit a MIMO transmission from a wireless communication device is referred to here as "ARP Ping", which in some implementations may utilize aspects of the standardized ARP Exchange mechanism. Address Resolution Protocol (ARP) is a protocol typically defined in the network layer; off-the-shelf applications for generating repeated standardized ARP Exchanges exist (e.g., arping). In many network contexts, communication is not possible without ARP, and APR is considered mandatory for every device. For example, ARP may be required for all IP networked devices. Devices may use ARP to obtain the data-link layer address of another device (which may be required for communication). The standardized ARP Exchange process is typically used to find the MAC address of the device that holds a given network layer (IP) address. In some systems, there are four addresses utilized: (1) the sender Network-Layer address, (2) the sender MAC-Layer address, (3) the target Network-Layer address, (4) the target MAC-Layer address. Both sender addresses (1 and 2) are known to the requester because they are the local addresses of the device making the request. The standardized ARP Exchange may be used when the target Network-Layer address (3) is known, but the target MAC-Layer address (4) is not known. The standardized ARP Exchange sends a broadcast MAC frame (Destination MAC Address=ff:ff:ff:ff:ff:ff), which means every device on the network receives the message. However, only the device that holds the given Target network layer (IP) Address can respond, and from that response, the Source MAC Address can be extracted. This exchange can create a request/response that is encapsulated into a MAC/PHY MIMO data transmission from the responding device in some instances. However, in other instances the standardized ARP Exchange does not elicit a MIMO transmission from the responding device. For example, some modern wireless communication devices may respond to the standardized ARP Exchange request using a legacy MAC/PHY data transmission, or can be cached and not actually transmitted.

As noted, a standardized ARP request is a broadcast layer-2 transmission (identified with the destination MAC address field set to ff:ff:ff:ff:ff:ff), which generally requires all devices belonging to the same logical network to receive the message. This means all layer-2 network devices (such as switches, bridges, wireless access points) are required to transmit the ARP request to all clients and can result in flooding the entire network with the single request. For the purpose of eliciting a single device to transmit a response for the purpose of motion sensing, flooding an entire network is not desirable and may introduce negative effects (e.g., power consumption, air-efficiency, or wired network resources). These negative effects may impact the network globally, whether or not specific clients are participating in the motion detection system. In some cases, the ARP Ping processes described here can be implemented in a manner that is more efficient and avoids the negative effects mentioned above. For example, the ARP Ping process shown in FIG. 13 may send an ARP request with a known destination MAC address (and without a broadcast MAC) to eliminate the broadcast nature of the request. For example, the ARP request may be addressed to the device from which MIMO transmissions are sought. Another type of ARP Ping process may be used.

Figure 12A:
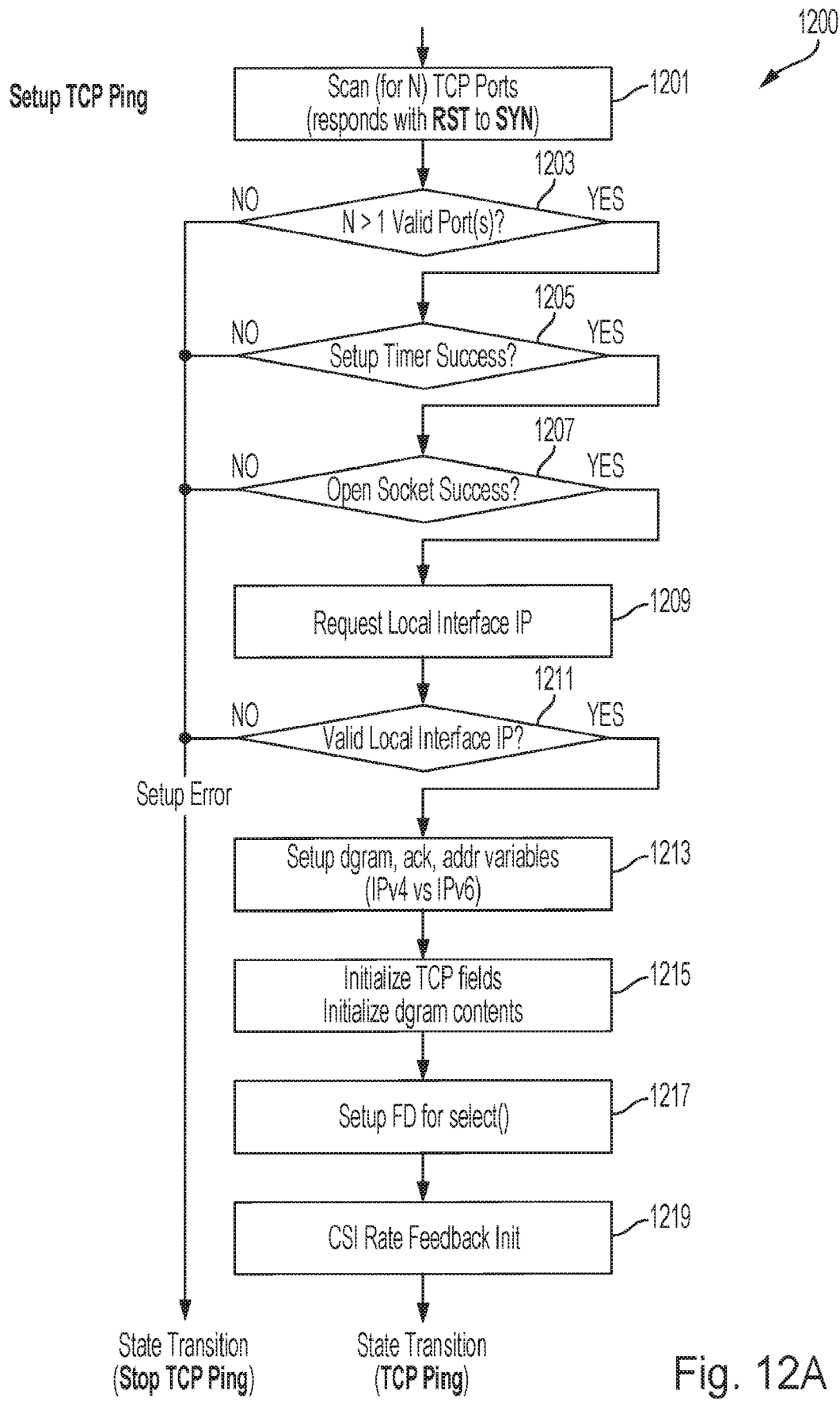
FIG. 12A shows a flowchart representing an example process to setup a TCP Ping.
Figure 12B:
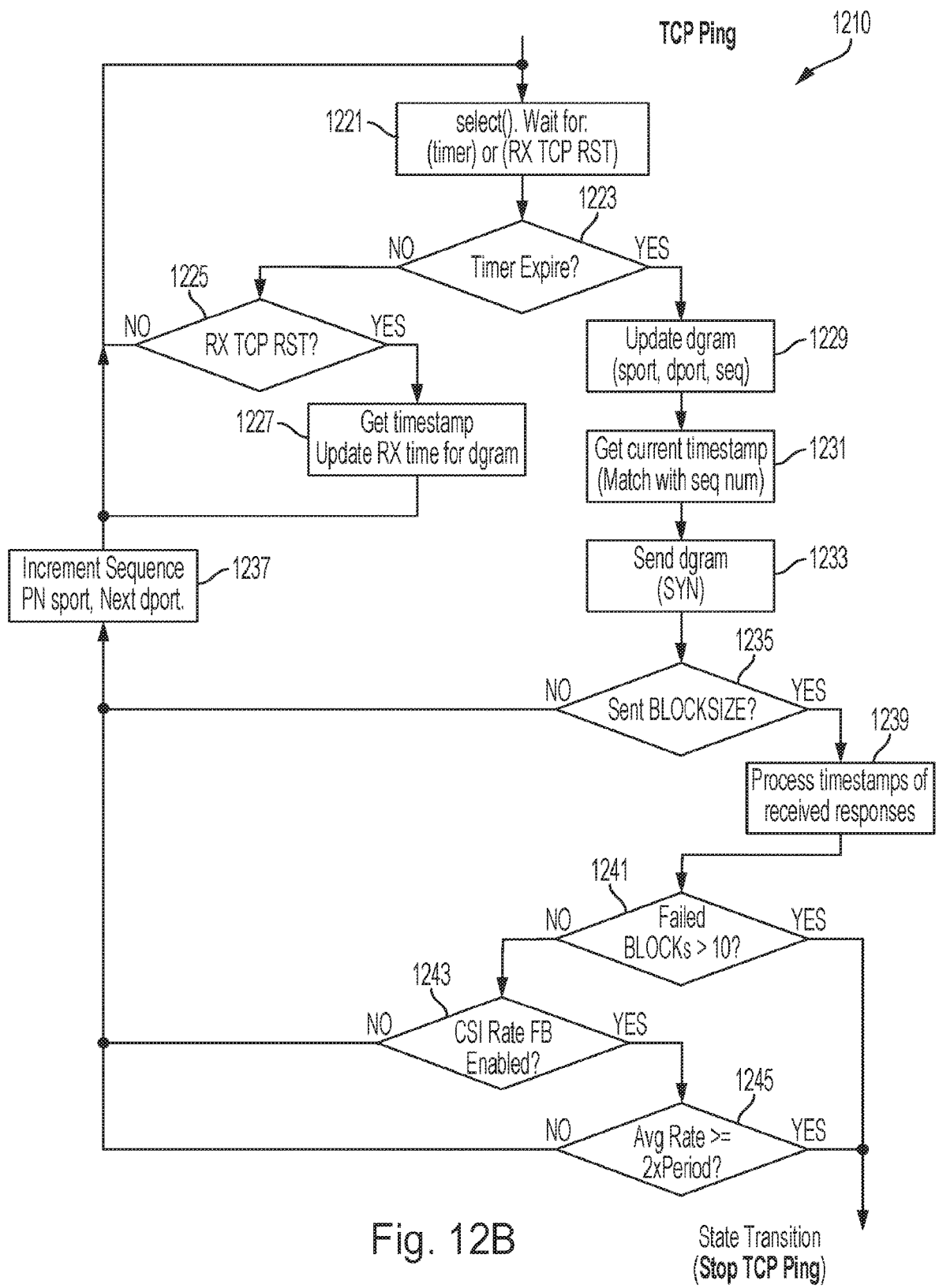
FIG. 12B shows a flowchart representing an example process to conduct a TCP Ping.

Another example technique that can be used to elicit a MIMO transmission from a wireless communication device is referred to here as "TCP Ping", which in some implementations may utilize aspects of the standardized TCP Handshake mechanism. In some cases, a TCP Ping can be used for sounding wireless communication devices to obtain wireless signals that can be used by a motion detection system. The TCP Ping process can be used to elicit MIMO transmissions from client/leaf devices in a variety of contexts, including scenarios where the client/leaf device is configured to not respond to ICMP requests (e.g., devices that do not have ICMP enabled), and scenarios where ARP responses from the client/leaf device result in a Legacy Wi-Fi transmission or a cached response. The Transmission Control Protocol (TCP) is typically defined in the transport layer; TCP generally operates as a connection-oriented protocol, meaning that data exchanges generally occur in both directions, which can be leveraged for eliciting MIMO transmissions from a device. Example TCP Ping processes are shown in FIGS. 12A, 12B. Another type of TCP Ping process may be used.

In some contexts, a typical execution of the standardized TCP Handshake starts by a client "requesting" to start a connection with a host. To start this transaction, the client populates the SRC and DST port fields, and sets the SYN flag. A host can do one of three actions: (1) It can accept the request, by responding with the ACK flag set; (2) It can reject the request, by responding with the RST flag set; or (3) It can do nothing and just drop the frame. The response from action (1) is received if there is an application listening to the given port on the host, and the connection has been accepted. The response from action (2) is typically received if either there is no application on the host listening to the given port, or potentially the port is blocked. And action (3) generally occurs if there is a firewall which has explicit instructions to drop any transmissions received by the specific host/port. Technically, a result of either action (1) or action (2) may create the ping request/response action that can produce a MIMO transmission. However, in some instances, action (1) is less desirable response because an additional message exchange is then required by the client to properly close the connection (and hence consume more air-time and reduce efficiency).

In some implementations, the TCP Ping process shown in FIGS. 12A, 12B performs a "port-scan" that identifies a set of ports which responds with a result of action (2). The "port-scan" may be executed, for example, in the same manner as the initial step in the standardized TCP Handshake, or in another manner. After a list of ideal ports have been obtained, one or more of them can be targeted for the TCP Ping process. In some implementations, during the scan phase, a delay may be added between requests (with no delay, requests may eventually be dropped); the scan phase of destination ports does not need to be linear (ports 1 to 65535) (e.g., a 16-bit maximum length PR sequence may be used to pick the destination ports); and the TCP Source Port may be randomized (e.g., a 16-bit maximum length PR sequence may be used for this). In some cases, scanning for and looping through 16 ports which respond to a SYN with an RST may be sufficient. This may be true in cases where the Source Port is randomized in a manner that is difficult to detect. It is also possible to periodically scan for a new set of 16 ports, however this may not be needed in all cases, for example, when pinging at a period of 100 ms.

Figure 10:
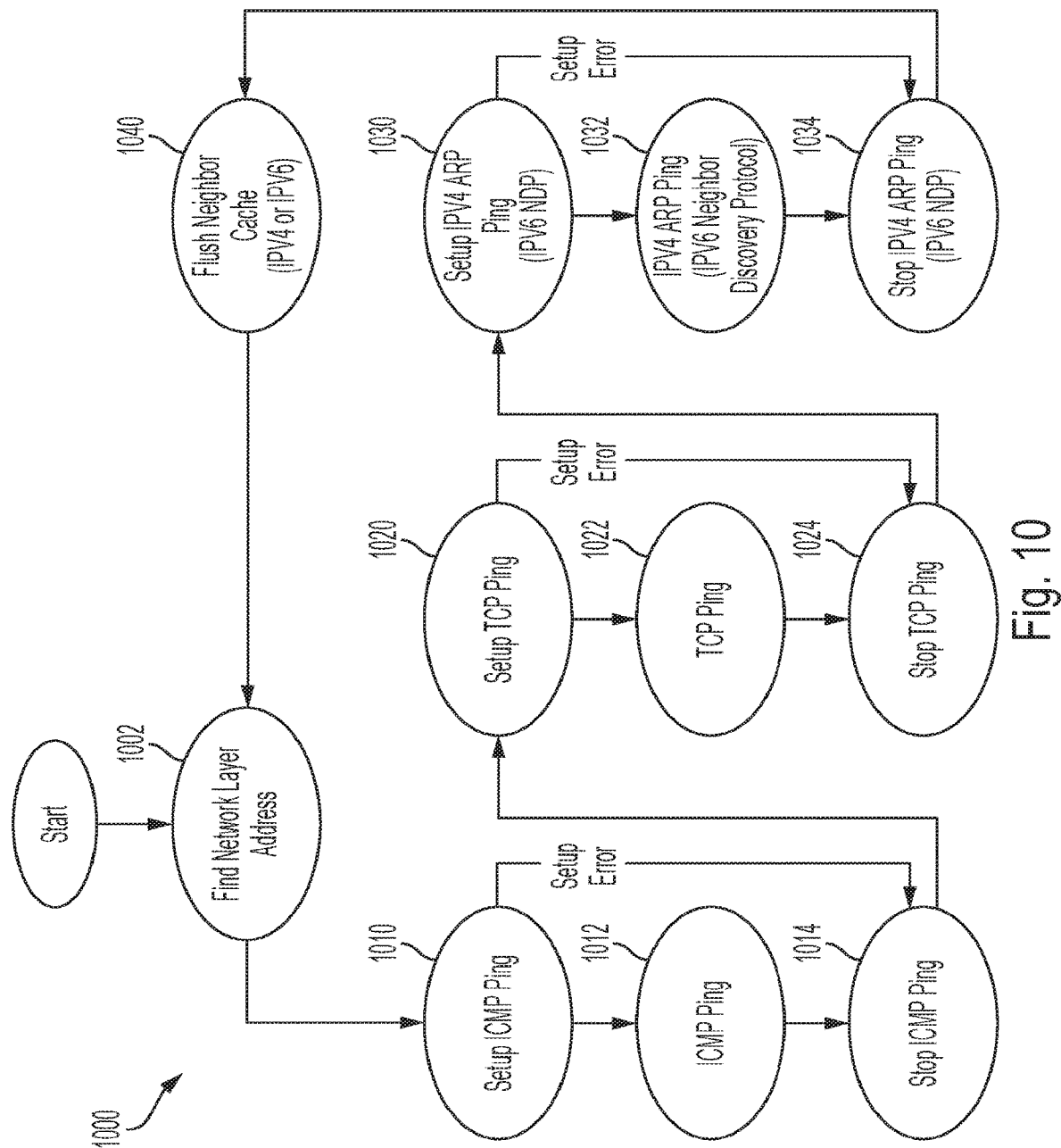
FIG. 10 is a state machine diagram representing an example process that elicits MIMO transmissions from wireless communication devices.

FIG. 10 is a state machine diagram representing an example process 1000 that elicits MIMO transmissions from wireless communication devices. The process 1000 may include additional or different operations, and the operations shown in FIG. 10 may be performed in the order shown or in another order. For example, in the example of FIG. 10, an ICMP Ping process is followed by a TCP Ping process, which in turn is followed by an ARP Ping process. However, in other implementations, any sequence or order of Ping processes may be used. In some cases, one or more of the operations shown in FIG. 10 are implemented as processes that include multiple operations, sub-processes for other types of routines. In some cases, operations can be combined, performed in another order, performed in parallel, iterated or otherwise repeated or performed in another manner. The process 1000 may be performed by the example wireless communication devices 102A, 102B, 102C shown in FIG. 1, by the example wireless communication devices 204A, 204B, 204C shown in FIGS. 2A and 2B, by any of the example devices (e.g., client devices 232 and AP devices 226, 228) shown in FIG. 2C, or by another type of device.

Implementations of the example process 1000 shown in FIG. 10 may utilize ICMP Ping processes, TCP Ping processes, IPv4 ARP Ping processes, IPv6 neighbor discovery protocol, or a combination of multiple types of ping processes. The process 1000 may be modified to utilize additional or different types of ping processes.

The example process 1000 shown in FIG. 10 combines multiple different ping mechanisms into a single protocol that can be controlled by a state machine. In some cases, by having each mechanism provide feedback to the state machine, as represented in FIG. 10, the process 1000 may select the best ping mechanism available to produce channel information to be used for motion detection. In some cases, feedback within each sub-process is used to help the state machine determine which mechanism is the best to use and may ensure that a reliable mechanism is selected. In the example shown in FIG. 10, each of the three ping mechanisms provides feedback to the motion detection system, so that the motion detection system can select one of the mechanisms based on the feedback (e.g., the mechanism that provides the best data for motion detection may be selected), and the motion detection system may select a different mechanism for each client/leaf node used by the motion detection system.

At 1002, a network layer address of a device is determined. For example, the process 900 shown in FIG. 9 or another type of process may be used to obtain an IP address of a device.

At 1010, 1012 and 1014, an ICMP Ping process is performed. As shown in FIG. 10, the ICMP Ping process includes a Setup ICMP Ping operation at 1010, an ICMP Ping operation at 1012 and a Stop ICMP Ping operation at 1014. The ICMP Ping process may include additional or different operations. In some instances, the ICMP Ping process elicits a MIMO transmission from the device (e.g., the device corresponding to the IP address found at 1002). In some cases, the ICMP Ping process does not elicit a MIMO transmission from the device, and the process 1000 proceeds to the TCP Ping process. In some implementations, two types of feedback may be used to make this decision of whether to proceed to the TCP Ping process: (1) the response received delay, and (2) the channel state information (CSI) generation rate. Either or both of these criteria can be used to evaluate the ICMP Ping process, and optionally switch to the TCP Ping process if results are not sufficient.

At 1020, 1022 and 1024, a TCP Ping process is performed. As shown in FIG. 10, the TCP Ping process includes a Setup TCP Ping operation at 1020, a TCP Ping operation at 1022 and a Stop TCP Ping operation at 1024. The TCP Ping process may include additional or different operations. In some instances, the TCP Ping process elicits a MIMO transmission from the device (e.g., the device corresponding to the IP address found at 1002). In some cases, the TCP Ping process does not elicit a MIMO transmission from the device, and the process 1000 proceeds to the ARP Ping process. In some implementations, two types of feedback may be used to make this decision of whether to proceed to the ARP Ping process: (1) the response received delay, and (2) the channel state information (CSI) generation rate. Either or both of these criteria can be used to evaluate the TCP Ping process, and optionally switch to the ARP Ping process if results are not sufficient.

At 1030, 1032 and 1034, an ARP Ping process is performed. As shown in FIG. 10, in instances where the IP address is an IPv4 address, the ARP Ping process includes a Setup IPv4 ARP Ping operation at 1030, an IPv4 ARP Ping operation at 1032 and a Stop IPv4 ARP Ping operation at 1034. In instances where the IP address is an IPv6 address, the ARP Ping process includes a Setup IPv6 neighbor discovery protocol operation at 1030, an IPv6 neighbor discovery protocol operation at 1032 and a Stop IPv6 neighbor discovery protocol operation at 1034. The ARP Ping process may include additional or different operations. In some instances, the ARP Ping process elicits a MIMO transmission from the device (i.e., the device corresponding to the IP address found at 1002). In some cases, the ARP Ping process does not elicit a MIMO transmission from the device, and the process 1000 proceeds to 1040. In some implementations, two types of feedback may be used to make this decision of whether to proceed to operation 1040: (1) the response received delay, and (2) the channel state information (CSI) generation rate. Either or both of these criteria can be used to evaluate the ARP Ping process, and optionally reiterate to another mechanism if results are not sufficient. At 1040, a neighbor cache is flushed, and the process 1000 proceeds to another iteration beginning at 1002.

FIG. 11A shows a flowchart representing an example process 1100 to setup an ICMP ping. FIG. 11B shows a flowchart of an example process 1110 to stop an ICMP ping. FIG. 11C shows a flowchart representing an example process 1120 to conduct an ICMP ping. The respective processes 1100, 1110, 1120 may include additional or different operations, and the operations shown in FIGS. 11A, 11B, and 11C may be performed in the order shown or in another order. In some cases, one or more of the operations shown in FIGS. 11A, 11B, and 11C are implemented as processes that include multiple operations, sub-processes for other types of routines. In some cases, operations can be combined, performed in another order, performed in parallel, iterated or otherwise repeated or performed in another manner. The processes 1100, 1110, 1120 may be performed by the example wireless communication devices 102A, 102B, 102C shown in FIG. 1, by the example wireless communication devices 204A, 204B, 204C shown in FIGS. 2A and 2B, by any of the example devices (e.g., client devices 232 and AP devices 226, 228) shown in FIG. 2C, or by another type of device.

The example processes 1100, 1110, 1120 shown in FIGS. 11A, 11B, and 11C may be used, for example, to perform operations 1010, 1014, 1012, respectively in the example process 1000 shown in FIG. 10. In some implementations, the example processes 1100, 1110, 1120 shown in FIGS. 11A, 11B, and 11C may be used in another context. In some implementations, for applications with wireless motion detection systems, the ICMP Ping processes represented in FIGS. 11A, 11B, and 11C can provide advantages, for example, as noted above.

The example process 1100 in FIG. 11A illustrates initialization logic for an ICMP ping process. In some implementations, the process 1100 initializes computing resources and message fields that are needed for the ICMP ping process 1110. The example process 1100 includes determining whether a timer has been set up successfully (at 1101). In some implementations, setting up the timer includes initiating an operating system (OS)-level call requesting the OS to set up a timer handle. In some instances, there may not be computing resources to set up the timer handle, and the OS may return an error message indicating the absence of such resources, thus indicating that the timer has not been set up successfully. Conversely, when there are sufficient computing resources to set up the timer handle, the OS may return a message indicating successful set up of the timer handle.

In response to a determination that the timer has not been successfully setup, the ICMP Ping mechanism may be terminated (e.g., by performing the process 1110 shown in FIG. 11B). Conversely, in response to a determination that the timer has been set up successfully, a determination is made (at 1103) as to whether a socket has been opened successfully. In some implementations, setting up the socket includes initiating an OS-level call requesting the OS to set up a socket handle. In some instances, there may not be computing resources to set up the socket handle, and the OS may return an error message indicating the absence of such resources, thus indicating that the socket has not been set up successfully. Conversely, when there are sufficient computing resources to set up the socket handle, the OS may return a message indicating successful set up of the socket handle.

In response to a determination that the socket has not been opened successfully, the ICMP Ping mechanism may be terminated (e.g., by performing the process 1110 shown in FIG. 11B). Conversely, in response to a determination that the socket has been opened successfully, the process 1100 proceeds to initialize a raw ICMP echo request frame (e.g., at 1105). At 1105, fields that are required for the ICMP ping messages are initialized and placed in the payload of the IPv4 or IPv6 frame.

At 1107, a sequence counter is initialized to zero. The sequence counter tracks the number of ICMP ping messages that are sent, and each ICMP ping message is matched to a respective sequence number (e.g., described in the example of FIG. 11C). At 1109, CSI rate feedback is initialized. In some implementations, the device from which MIMO transmissions are elicited can provide CSI to the device transmitting the ICMP ping messages. By initializing CSI rate feedback at 1109, CSI can be obtained from the MIMO transmissions that are elicited by the ICMP ping messages, and the rate at which the CSI is being received can be determined to ascertain whether CSI is being received at a rate that is fast enough to accurately or reliably detect motion in the space 200, 201.

The example process 1110 in FIG. 11B illustrates termination logic for an ICMP ping process. In some implementations, the process 1110 releases the computing resources that were requested in the initialization process 1100. At 1111, the timer (e.g., requested at 1101) is disabled and at 1113, the socket (e.g., requested at 1103) is closed. In some implementations, the timer is disabled and the socket is closed by an OS-level call that indicates, to the OS, that these resources are no longer needed.

The example process 1120 in FIG. 11C illustrates a process of conducting the ICMP ping. In some implementations, the ICMP ping includes sending a predetermined number of consecutive ICMP ping messages (e.g., using the operations at 1121, 1123, 1125, 1127, 1129, 1131). In some instances, the predetermined number of consecutive ICMP ping messages may be referred to as a block of ICMP ping messages. The number of consecutive ICMP ping messages within the block (referred to as "BLOCKSIZE") can be an application-specific tuned parameter, for example 64 ICMP ping messages. The "BLOCKSIZE" can also be set based on the period at which the space 200, 201 is sampled for motion. In some implementations, the space 200, 201 is sampled every 100 milliseconds, and a reasonable "BLOCKSIZE" is equal to 64 ICMP ping messages. After a block of ICMP ping messages has been sent, the process 1120 analyzes the received responses (e.g., using the operations at 1133, 1135, 1137, 1139) to determine whether MIMO transmissions have been successfully elicited by the block of ICMP ping messages or whether a further block of ICMP ping messages needs to be transmitted.

At 1121, an ICMP ping message is updated. In some instances, an ICMP ping message may be referred to as an echo request frame, and updating the ICMP ping message may include updating fields (e.g., the checksum field) of the ICMP ping message. At 1123, a timer tick is awaited. The timer tick allows for a predetermined period of time (e.g., about 100 milliseconds) to elapse so that a wireless signal (e.g., a MIMO transmission) can be received in response to a previously transmitted ICMP ping message. In some instances, the predetermined period of time may be equal to the period at which the space 200, 201 is sampled for motion. After the timer tick occurs, at 1125, the timestamp of the ICMP ping message that was updated at 1121 is determined. In some instances, the timestamp of the ICMP ping message is matched to the current sequence number. At 1127, the ICMP ping message that was updated at 1121 is sent. In some implementations, the ICMP ping message may be referred to as an ICMP echo request.

At 1129, a determination is made as to whether the predetermined number of consecutive ICMP ping messages (e.g., "BLOCKSIZE") has been sent. In response to a determination that the predetermined number of consecutive ICMP ping messages has not been sent, the sequence counter is incremented (at 1131) and process 1120 is iterated from 1121. In response to a determination that the predetermined number of consecutive ICMP ping messages has been sent, a feedback or check mechanism is executed.

In the example process 1120, the feedback or check mechanism (e.g., including operations 1133, 1135, 1137, 1139) is executed after the block of ICMP ping messages has been sent. At 1133, the timestamps of the received responses are processed to determine a difference between the time a respective ICMP ping message was transmitted (e.g., obtained from the timestamp associated with the ICMP ping message) and the time its corresponding response was received. If the time difference associated with any ICMP ping message within the block of ICMP ping messages is greater than a threshold, then the entire block of ICMP ping messages is deemed to be a failed block. This failure logic may be implemented inside operation 1133 that processes timestamps of received responses.

At 1135, a determination is made as to whether the number of consecutive failed blocks is greater than a threshold number of failures. In the example shown in FIG. 11C, the threshold number of failures is depicted as being 10, but another integer threshold number may be used in other examples. A determination that the number of consecutive failed blocks is greater than the threshold number of failures may indicate that repeated blocks of ICMP ping messages have failed to elicit successful MIMO transmissions from a wireless communication device. Therefore, in response to a determination that the number of consecutive failed blocks is greater than the threshold number of failures, the ICMP Ping mechanism may be terminated in favor of attempting another type of mechanism.

In response to a determination that the number of consecutive failed blocks is not greater than the threshold number of failures, a secondary feedback check is performed. The secondary feedback check is referred to in FIG. 11C as CSI rate feedback (CSI Rate FB) (e.g., in operations 1137 and 1139). The checks performed at 1137 and 1139 determine the rate at which MIMO transmissions (including CSI) are being received in response to the block of ICMP ping messages. If the ICMP Ping response is encapsulated by the client/leaf device in a MAC data frame that does not contain a MIMO training field, the response times may pass the check at 1135, but without a MIMO training field, there may be no CSI output from the radio. Accordingly, the secondary check at 1137 and 1139 may be used to ensure the block of ICMP ping messages elicits responses containing a MIMO training field.

At 1137, a determination is made as to whether CSI rate feedback is enabled, and if so, a determination is made (at 1139) as to whether the average CSI rate is greater than or equal to twice the period at which the space 200, 201 is sampled for motion. A determination that the average CSI rate is greater than or equal to twice the period at which the space 200, 201 is sampled may indicate that MIMO transmissions (including CSI) are not being received at a rate that is fast enough to accurately or reliably detect motion in the space 200, 201. Consequently, in response to a determination that the average CSI rate is greater than or equal to twice the period at which the space 200, 201 is sampled, the ICMP Ping mechanism may be terminated in favor of attempting another type of mechanism. Conversely, if CSI rate feedback is not enabled or if the average CSI rate is less than twice the period at which the space 200, 201, the sequence counter is incremented (at 1131) and process 1120 is iterated from 1121.

FIG. 12A shows a flow chart representing an example process 1200 to setup a TCP Ping. FIG. 12B shows a flow chart representing an example process 1210 to conduct a TCP Ping. The respective processes 1200, 1210 may include additional or different operations, and the operations shown in FIGS. 12A and 12B may be performed in the order shown or in another order. In some cases, one or more of the operations shown in FIGS. 12A and 12B are implemented as processes that include multiple operations, sub-processes for other types of routines. In some cases, operations can be combined, performed in another order, performed in parallel, iterated or otherwise repeated or performed in another manner. The processes 1200 and 1210 may be performed by the example wireless communication devices 102A, 102B, 102C shown in FIG. 1, by the example wireless communication devices 204A, 204B, 204C shown in FIGS. 2A and 2B, by any of the example devices (e.g., client devices 232 and AP devices 226, 228) shown in FIG. 2C, or by another type of device.

The example processes 1200, 1210 shown in FIGS. 12A, 12B may be used, for example, to perform operations 1020, 1022 in the example process 1000 shown in FIG. 10. In some implementations, the example processes 1200, 1210 shown in FIGS. 12A, 12B may be used in another context.

The example processes 1200 determines the number of valid TCP ports in the network, obtains a valid local interface IP address, and initializes computing resources and message fields that are needed for the TCP ping process 1210. The example process 1200 includes scanning the network for TCP ports (at 1201). In some implementations, the network is scanned for TCP ports by sending a TCP packet with a set synchronize (SYN) flag to each port identifier. For example, FIG. 8 shows a TCP packet having various fields, including a field for various flags. The SYN flag depicted in the example of FIG. 8 may be set in the TCP packet that is sent to each port identifier. In some instances, a port identifier is a 16-bit identifier, and the TCP packet with the set SYN flag is sent to each unique 16-bit identifier. A valid TCP port may respond to the TCP packet having the set SYN flag with a TCP packet having a set reset (RST) flag. For example, the RST flag depicted in the example of FIG. 8 may be set in the TCP packet that is sent as a response. At 1203, a determination is made as to whether there is more than one valid TCP port. In some implementations, the number of valid TCP ports is determined by counting the number of received TCP packets having a set RST flag.

In response to a determination that there is less than or equal to one valid TCP port, the TCP ping setup is terminated (e.g., in favor of attempting another type of mechanism). Conversely, in response to a determination that there is more than one valid TCP port, a determination is made (at 1205) as to whether a timer has been set up successfully. In some implementations, an OS-level call similar to the OS-level call described for operation 1101 may be used to determine whether the timer has been set up successfully.

In response to a determination that the timer has not been set up successfully, the TCP ping setup is terminated (e.g., in favor of attempting another type of mechanism). Conversely, in response to a determination that the timer has been set up successfully, a determination is made (at 1207) as to whether a socket has been opened successfully. An OS-level call similar to the OS-level call described for operation 1103 may be used to determine whether the socket has been set up successfully.

In response to a determination that the socket has not been opened successfully, the TCP ping setup is terminated (e.g., in favor of attempting another type of mechanism). However, in response to a determination that the socket has been opened successfully, a local interface IP address is requested (at 1209). In some implementations, requesting a local interface IP address includes initiating an OS-level call requesting a local interface IP address from the OS. At 1211, a determination is made as to whether a valid local interface IP address has been obtained. A valid local interface IP address is obtained when there are sufficient computing resources available for the OS to provide the local interface IP address. In some instances, there may not be computing resources to provide a local interface IP address, and the OS may return an error message indicating this. Therefore, a valid local interface IP address is not obtained when there are insufficient computing resources available to provide the local interface IP address.

In response to a determination that a valid local interface IP address is not obtained, the TCP ping setup is terminated (e.g., in favor of attempting another type of mechanism). Conversely, in response to a determination that a valid local interface IP address has been obtained, variables of a TCP ping message are set up (at 1213). For example, the various fields of the example TCP packet shown in FIG. 8 are set up at 1213. In some instances, a TCP ping message may be referred to as a datagram (indicated in FIG. 12A as "dgram"), and the acknowledgement variable (indicated in FIG. 12A as "ack" and shown in FIG. 8 as the flag "ACK"), the address variables (indicated in FIG. 12A as "addr" and shown in FIG. 8 as "Source Port" and "Destination Port"), or both, of the datagram may be set up at 1213. The combination of variables that are set up may depend, at least in part, on whether the IPv4 of the IPv6 protocol is used at the network layer.

At 1215, TCP fields and the contents of the datagram are initialized. For example, the various fields of the TCP packet shown in FIG. 8 are initialized at 1215. At 1217, file descriptors (indicated in FIG. 12A as "FD") for a select function (indicated in FIG. 12A as "select( )") are set up. In some instances, the select function is configured to inform the OS to generate an alert when an event included in the file descriptors has occurred. In some implementations, the file descriptors can include the reception of a TCP packet having a set RST flag, a timer expiration, or both. Therefore, in such implementations, the OS generates an alert when the timer has expired or when a TCP packet having a set RST flag is received. In some instances, the timer is set to expire after a predetermined period of time, which may be equal to the period at which the space 200, 201 is sampled for motion (e.g., 100 milliseconds in some instances).

At 1219, CSI rate feedback is initialized. In some implementations, the device from which MIMO transmissions are elicited can provide CSI to the device transmitting the ICMP ping messages. By initializing CSI rate feedback at 1219, CSI can be obtained from the MIMO transmissions that are elicited by the TCP ping messages, and the rate at which the CSI is being received can be determined to ascertain whether CSI is being received at a rate that is fast enough to accurately or reliably detect motion in the space 200, 201.

The example process 1210 in FIG. 12B illustrates a process of conducting the TCP ping. In some implementations, the TCP ping includes sending a predetermined number of consecutive TCP ping messages (e.g., using the operations at 1221, 1223, 1225, 1227, 1229, 1231, 1233, 1235, 1237). In some instances, the predetermined number of consecutive TCP ping messages may be referred to as a block of datagrams. The number of consecutive datagrams within the block (referred to as "BLOCKSIZE") can be an application-specific tuned parameter, for example 64 datagrams. The "BLOCKSIZE" can depend on the period at which the space 200, 201 is sampled for motion. In some implementations, the space 200, 201 is sampled every 100 milliseconds, and a reasonable "BLOCKSIZE" is equal to 64 datagrams. After a block of datagrams has been sent, the process 1210 analyzes the received responses (e.g., using the operations at 1239, 1241, 1243, 1245) to determine whether MIMO transmissions have been successfully elicited by the block of datagrams or whether a further block of datagrams needs to be transmitted.

At 1221, the select function is executed. The select function waits for an event included in the file descriptors to occur. In some implementations, the file descriptors can include the reception of a TCP packet having a set RST flag, expiration of the timer, or both. In essence, at 1221, a period of time is allowed to elapse so that a wireless signal (e.g., a MIMO transmission) can be received in response to a previously transmitted TCP ping message.

After the alert has been generated by the OS, a determination is made (at 1223) as to whether the timer has expired. The determination at 1223 ascertains whether the alert at 1221 can be attributed to the expiration of the timer. In response to a determination that the timer has not expired, a determination is made (at 1225) as to whether a TCP packet having a set RST flag was received. The determination at 1225 ascertains whether the alert at 1221 can be attributed to the reception of a TCP packet having a set RST flag. In response to a determination that a TCP packet having a set RST flag was not received, process 1210 is iterated starting at 1221. Conversely, in response to a determination that a TCP packet having a set RST flag was received, the timestamp of the received datagram is obtained and the timestamp is used to indicate the time at which the datagram is received (at 1227). The process 1210 is subsequently iterated starting at 1221.

Conversely, in response to a determination that the timer has expired, the datagram is updated (at 1229). In some instances, the port identifiers (e.g., 16-bit port identifiers) for a valid source port (indicated in FIG. 12B as "sport" and shown in FIG. 8 as "Source Port") and a valid destination port (indicated in FIG. 12B as "dport" and shown in FIG. 8 as "Destination Port") are updated at 1229. The port identifiers for valid source and destination ports may be obtained, as an example, at 1201 and 1203 when the network is scanned for valid TCP ports.

At 1231, the timestamp of the datagram that was updated at 1229 is determined. In some instances, the timestamp of the datagram is matched to the current sequence number. At 1233, the datagram that was updated at 1229 is sent (e.g., from the valid source port to the valid destination port). In some implementations, the datagram is sent as a TCP packet having a set SYN flag.

At 1235, a determination is made as to whether the predetermined number of consecutive datagrams (e.g., "BLOCKSIZE") has been sent. In response to a determination that the predetermined number of consecutive datagrams has not been sent, the sequence counter is incremented, a valid source port is pseudo-randomly chosen, and the next valid destination port is selected (at 1237), and process 1210 is iterated from 1221. In response to a determination that the predetermined number of consecutive datagrams has been sent, a feedback or check mechanism is executed.

In the example process 1210, the feedback or check mechanism (e.g., including operations 1239, 1241, 1243, 1245) is executed after the block of datagrams has been sent. At 1239, the timestamps of the received responses are processed to determine a difference between the time a respective datagram was transmitted (e.g., obtained from the timestamp associated with the datagram) and the time its corresponding response was received. If the time difference associated with any datagram within the block of datagrams is greater than a threshold, then the entire block of datagrams is deemed to be a failed block. This failure logic may be implemented inside operation 1239 that processes timestamps of received responses.

At 1241, a determination is made as to whether the number of consecutive failed blocks is greater than a threshold number of failures. In the example shown in FIG. 12B, the threshold number of failures is depicted as being 10, but another integer threshold number may be used in other examples. A determination that the number of consecutive failed blocks is greater than the threshold number of failures may indicate that repeated blocks of datagrams (or TCP ping messages) have failed to elicit successful MIMO transmissions from a wireless communication device. Therefore, in response to a determination that the number of consecutive failed blocks is greater than the threshold number of failures, the TCP Ping mechanism may be terminated in favor of attempting another type of mechanism.

In response to a determination that the number of consecutive failed blocks is not greater than the threshold number of failures, a secondary feedback check is performed. The secondary feedback check is referred to in FIG. 12B as CSI rate feedback (CSI Rate FB) (e.g., in operations 1243 and 1245). The checks performed at 1243 and 1245 determine the rate at which MIMO transmissions (including CSI) are being received in response to the block of datagrams. If the TCP packet having a set SYN flag is encapsulated by the client/leaf device in a MAC data frame that does not contain a MIMO training field, the response times may pass the check at 1241, but without a MIMO training field, there may be no CSI output from the radio. Accordingly, the secondary check at 1243 and 1245 may be used to ensure the block of datagrams elicits responses containing a MIMO training field.

At 1243, a determination is made as to whether CSI rate feedback is enabled, and if so, a determination is made (at 1245) as to whether the average CSI rate is greater than or equal to twice the period at which the space 200, 201 is sampled for motion. A determination that the average CSI rate is greater than or equal to twice the period at which the space 200, 201 is sampled may indicate that MIMO transmissions (including CSI) are not being received at a rate that is fast enough to accurately or reliably detect motion in the space 200, 201. Consequently, in response to a determination that the average CSI rate is greater than or equal to twice the period at which the space 200, 201 is sampled, the TCP Ping mechanism may be terminated in favor of attempting another type of mechanism. Conversely, if CSI rate feedback is not enabled or if the average CSI rate is less than twice the period at which the space 200, 201, the sequence counter is incremented, a valid source port is pseudo-randomly chosen, and the next valid destination port is selected (at 1237), and process 1210 is iterated from 1221.

Figure 13:
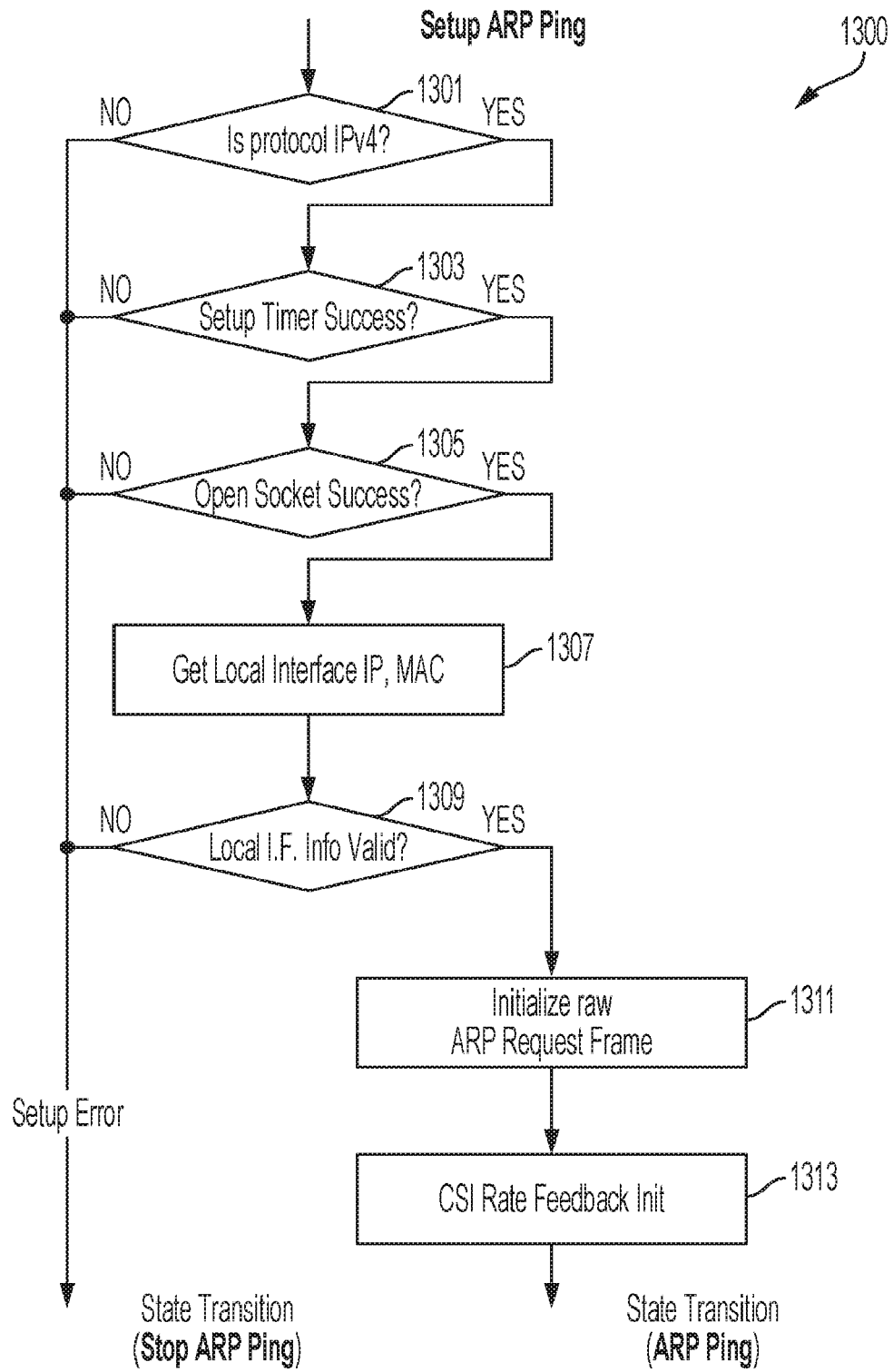
FIG. 13 shows a flowchart representing an example process to setup an ARP Ping.

FIG. 13 shows a flow chart representing an example process 1300 to setup an ARP ping. The process 1300 may include additional or different operations, and the operations shown in FIG. 13 may be performed in the order shown or in another order. In some cases, one or more of the operations shown in FIG. 13 are implemented as processes that include multiple operations, sub-processes for other types of routines. In some cases, operations can be combined, performed in another order, performed in parallel, iterated or otherwise repeated or performed in another manner. The process 1400 may be performed by the example wireless communication devices 102A, 102B, 102C shown in FIG. 1, by the example wireless communication devices 204A, 204B, 204C shown in FIGS. 2A and 2B, by any of the example devices (e.g., client devices 232 and AP devices 226, 228) shown in FIG. 2C, or by another type of device.

The example process 1300 shown in FIG. 13 may be used, for example, to perform operation 1030 in the example process 1000 shown in FIG. 10. In some implementations, the example process 1300 shown in FIG. 13 may be used in another context. In some implementations, for applications with wireless motion detection systems, the ARP Ping processes represented in FIG. 13 can provide advantages, for example, compared to using standard tools (e.g., arping). For instance, the ARP Ping process represented in FIG. 13 may provide an ARP request without a broadcast MAC, but instead with the desired destination MAC address (which is already known), which can eliminate the broadcast nature of the ARP request.

The example process 1300 is used when the IPv4 protocol operates at the network layer, and at 1301, a determination is made as to whether the IPv4 protocol is used. The cache that is queried at 902 in FIG. 9 contains an IPv4 neighbor table when the IPv4 protocol is used, and thus the determination made at 1301 can be made based whether an IPv4 neighbor table exists in the cache queried at 902. In response to a determination that the IPv4 protocol is not used, the ARP Ping setup may be terminated (e.g., in favor of attempting another type of mechanism).

Conversely, in response to a determination that the IPv4 protocol is used, a determination is made (at 1303) as to whether a timer has been set up successfully. In some implementations, an OS-level call similar to the OS-level call described for operation 1101 may be used to determine whether the timer has been set up successfully.

In response to a determination that the timer has not been set up successfully, the ARP ping setup is terminated (e.g., in favor of attempting another type of mechanism). Conversely, in response to a determination that the timer has been set up successfully, a determination is made (at 1305) as to whether a socket has been opened successfully. An OS-level call similar to the OS-level call described for operation 1103 may be used to determine whether the socket has been set up successfully.

In response to a determination that the socket has not been opened successfully, the ARP ping setup is terminated (e.g., in favor of attempting another type of mechanism). However, in response to a determination that the socket has been opened successfully, a local interface IP address and a MAC address are requested (at 1307). In some implementations, requesting a local interface IP address and a MAC address includes initiating an OS-level call requesting a local interface IP address and a MAC address from the OS. At 1309, a determination is made as to whether a valid local interface IP address has been obtained. A valid local interface IP address is obtained when there are sufficient computing resources available for the OS to provide the local interface IP address. In some instances, there may not be computing resources to provide a local interface IP address, and the OS may return an error message indicating this. Therefore, a valid local interface IP address is not obtained when there are insufficient computing resources available to provide the local interface IP address.

In response to a determination that a valid local interface IP address is not obtained, the ARP ping setup is terminated (e.g., in favor of attempting another type of mechanism). Conversely, in response to a determination that a valid local interface IP address has been obtained, the process 1300 proceeds to initialize a raw ARP request frame (e.g., at 1311). At 1311, fields that are required for the ARP ping messages are initialized and placed in the payload of the IPv4 frame.

At 1313, CSI rate feedback is initialized. In some implementations, the device from which MIMO transmissions are elicited can provide CSI to the device transmitting the ARP ping messages. By initializing CSI rate feedback at 1313, CSI can be obtained from the MIMO transmissions that are elicited by the ARP ping messages, and the rate at which the CSI is being received can be determined to ascertain whether CSI is being received at a rate that is fast enough to accurately or reliably detect motion in the space 200, 201.

Figure 14:
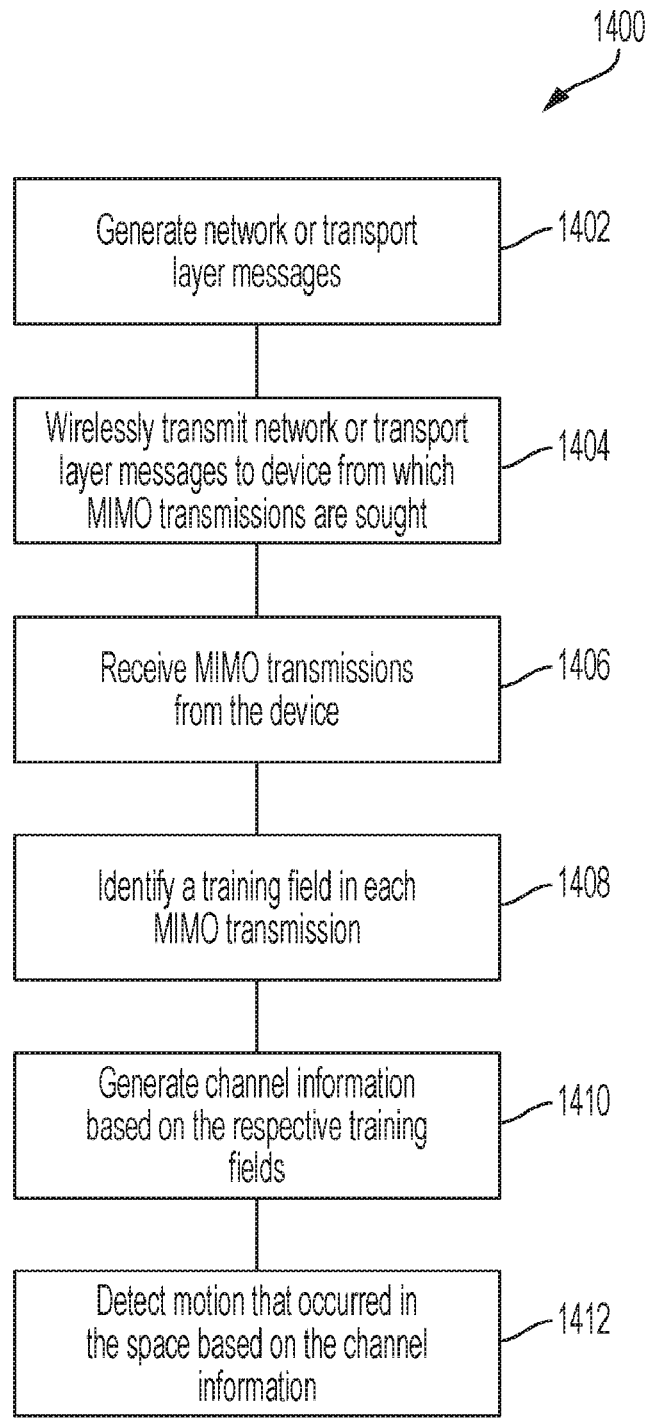
FIG. 14 shows a flowchart representing an example method of eliciting MIMO transmissions from wireless communication devices.

FIG. 14 shows a flowchart representing an example process 1400 of eliciting MIMO transmissions from wireless communication devices. The process 1400 may include additional or different operations, and the operations shown in FIG. 14 may be performed in the order shown or in another order. In some cases, one or more of the operations shown in FIG. 14 are implemented as processes that include multiple operations, sub-processes for other types of routines. In some cases, operations can be combined, performed in another order, performed in parallel, iterated or otherwise repeated or performed in another manner. The process 1400 may be performed by the example wireless communication devices 102A, 102B, 102C shown in FIG. 1, by the example wireless communication devices 204A, 204B, 204C shown in FIGS. 2A and 2B, by any of the example devices (e.g., client devices 232 and AP devices 226, 228) shown in FIG. 2C, or by another type of device.

The process 1400 may be performed by a wireless communication device that seeks to elicit MIMO transmissions from another wireless communication device. At 1402, network or transport layer messages are generated. Network layer messages may be generated when an ICMP ping process (e.g., described in FIGS. 11A, 11B, 11C) or an ARP ping process (e.g., described in FIG. 13) is used to elicit the MIMO transmissions. As described in FIG. 8, the network layer messages may be encapsulated into the payload field of respective Media Access Control (MAC) layer messages. Transport layer messages may be generated when a TCP ping process (e.g., described in FIGS. 12A, 12B) is used to elicit the MIMO transmissions. As described in FIG. 8, transport layer messages that may be generated may be encapsulated into the payload field of respective network layer messages. In some implementations, the network or transport layer messages may be addressed to the device from which MIMO transmissions are sought. The address of the device from which MIMO transmissions are sought may be an upper layer logical address (e.g., network address) of the device and may be obtained using the process described in FIG. 10.

At 1404 the network or transport layer messages are wirelessly transmitted to the device from which MIMO transmissions are sought. The network layer messages may be wirelessly transmitted according to the ICMP Ping process (e.g., described in FIGS. 11A, 11B, 11C), the ARP Ping process (e.g., described in FIG. 13), or a combination thereof. The transport layer messages may be wirelessly transmitted according to the TCP Ping process (e.g., described in FIGS. 12A, 12B).

In some examples, the device that transmits the network or transport layer messages may detect a failure of the network or transport layer messages to elicit successful MIMO transmissions from the device to which the network or transport layer messages are addressed. For example, the failure of the network or transport layer messages to elicit successful MIMO transmissions may manifest itself as the number of consecutive failed blocks being greater than a threshold number of failures (e.g., at 1135 in FIG. 11C or at 1241 in FIG. 12B) or the MIMO transmissions (including CSI) are not being received at a rate that is fast enough to accurately or reliably detect motion in the space (e.g., at 1139 in FIG. 11C or at 1245 in FIG. 12B). When such a failure occurs, the device that transmits the network or transport layer messages may terminate the mechanism used to transmit the network or transport layer messages in favor of attempting another type of mechanism to transmit the network or transport layer messages. For example, as seen in FIG. 10, an ICMP ping process that transmits network layer messages may fail to elicit successful MIMO transmissions, and the device may instead transmit transport layer messages using a TCP ping process to elicit successful MIMO transmissions. As another example, a TCP ping process that transmits transport layer messages may fail to elicit successful MIMO transmissions, and the device may instead transmit network layer messages using an ARP ping process to elicit successful MIMO transmissions.

At 1406, MIMO transmissions are received from the device to which the network or transport layer messages are addressed. The MIMO transmissions can include MIMO training fields. The MIMO training fields contain signals (e.g., CSI) having a higher frequency resolution, a greater number of subcarrier frequencies, and a higher frequency bandwidth compared to Legacy training fields in the PHY frame. Use of the MIMO training field for motion detection provides more accurate motion detection capabilities. Therefore, at 1408, a training field is identified in each MIMO transmission, and channel information is generated based on the training field (at 1410). At 1412, the channel information is used to detect motion that occurred in a space (e.g., the space 200, 201).

Figure 15:
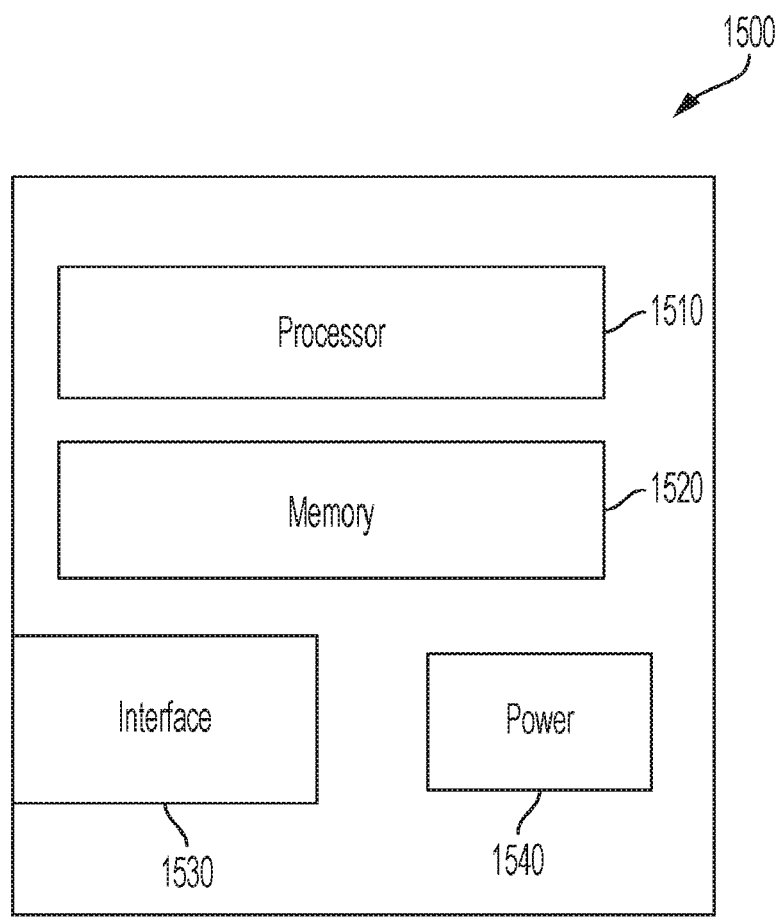
FIG. 15 is a block diagram showing an example wireless communication device.

FIG. 15 is a block diagram showing an example wireless communication device 1500. As shown in FIG. 15, the example wireless communication device 1500 includes an interface 1530, a processor 1510, a memory 1520, and a power unit 1540. A wireless communication device (e.g., any of the wireless communication devices 102A, 102B, 102C in FIG. 1, wireless communication devices 204A, 204B, 204C shown in FIGS. 2A and 2B, client devices 232 and AP devices 226, 228 shown in FIG. 2C) may include additional or different components, and the wireless communication device 1500 may be configured to operate as described with respect to the examples above. In some implementations, the interface 1530, processor 1510, memory 1520, and power unit 1540 of a wireless communication device are housed together in a common housing or other assembly. In some implementations, one or more of the components of a wireless communication device can be housed separately, for example, in a separate housing or other assembly.

The example interface 1530 can communicate (receive, transmit, or both) wireless signals. For example, the interface 1530 may be configured to communicate radio frequency (RF) signals formatted according to a wireless communication standard (e.g., Wi-Fi, 4G, 5G, Bluetooth, etc.). In some implementations, the example interface 1530 includes a radio subsystem and a baseband subsystem. The radio subsystem may include, for example, one or more antennas and radio frequency circuitry. The radio subsystem can be configured to communicate radio frequency wireless signals on the wireless communication channels. As an example, the radio subsystem may include a radio chip, an RF front end, and one or more antennas. The baseband subsystem may include, for example, digital electronics configured to process digital baseband data. In some cases, the baseband subsystem may include a digital signal processor (DSP) device or another type of processor device. In some cases, the baseband system includes digital processing logic to operate the radio subsystem, to communicate wireless network traffic through the radio subsystem or to perform other types of processes.

The example processor 1510 can execute instructions, for example, to generate output data based on data inputs. The instructions can include programs, codes, scripts, modules, or other types of data stored in memory 1520. Additionally or alternatively, the instructions can be encoded as pre-programmed or re-programmable logic circuits, logic gates, or other types of hardware or firmware components or modules. The processor 1510 may be or include a general-purpose microprocessor, as a specialized co-processor or another type of data processing apparatus. In some cases, the processor 1510 performs high level operation of the wireless communication device 1500. For example, the processor 1510 may be configured to execute or interpret software, scripts, programs, functions, executables, or other instructions stored in the memory 1520. In some implementations, the processor 1510 be included in the interface 1530 or another component of the wireless communication device 1500.

The example memory 1520 may include computer-readable storage media, for example, a volatile memory device, a non-volatile memory device, or both. The memory 1520 may include one or more read-only memory devices, random-access memory devices, buffer memory devices, or a combination of these and other types of memory devices. In some instances, one or more components of the memory can be integrated or otherwise associated with another component of the wireless communication device 1500. The memory 1520 may store instructions that are executable by the processor 1510. For example, the instructions may include instructions to perform one or more of the operations described above.

The example power unit 1540 provides power to the other components of the wireless communication device 1500. For example, the other components may operate based on electrical power provided by the power unit 1540 through a voltage bus or other connection. In some implementations, the power unit 1540 includes a battery or a battery system, for example, a rechargeable battery. In some implementations, the power unit 1540 includes an adapter (e.g., an AC adapter) that receives an external power signal (from an external source) and coverts the external power signal to an internal power signal conditioned for a component of the wireless communication device 1500. The power unit 1520 may include other components or operate in another manner.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data-processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, MIMO transmissions are elicited from wireless communication devices and for wireless sensing.

In some aspects, a wireless sensing system (e.g., a motion detection system) initiates a message through a communication protocol defined in a layer above the physical (PHY) layer and the data link (MAC) layer in a first wireless communication device (e.g., in a transport layer or a network layer). The message is addressed to, and wirelessly transmitted to, a second wireless communication device. In response to the message, the second wireless communication device sends a MIMO transmission that traverses a space between the first and second wireless communication devices. The first wireless communication device senses the space (e.g., detects motion of an object in the space) based on the MIMO transmissions.

In a first example, a first wireless communication device: obtains a network layer address of a second wireless communication device; addresses network layer messages to the network layer address of the second wireless communication device; initiates wireless transmission of the network layer messages; in response to the network layer messages, receives MIMO transmissions from the second wireless communication device, where the MIMO transmissions traverse a space between the first and second wireless communication devices; generates a series of channel responses based on a training field in the MIMO transmissions; and detects motion of an object in the space based on the series of channel responses.

Implementations of the first example may include one or more of the following features. The network layer messages can be sent according to an ICMP Ping process, an ARP ping process, or another type of process. The MIMO training field can be an HE-LTF, VHT-LTF or an HT-LTF. The wireless sensing may include detecting motion of an object in the space.

In a second example, a first wireless communication device: generates a transport layer message addressed to a second wireless communication device; initiates wireless transmission of the transport layer messages; in response to the transport layer messages, receives MIMO transmissions from the second wireless communication device, where the MIMO transmissions traverse a space between the first and second wireless communication devices; generates a series of channel responses based on a training field in the MIMO transmissions; and performs wireless sensing of the space based on the series of channel responses.

Implementations of the second example may include one or more of the following features. The transport layer messages can be sent according to a TCP Ping process, or another type of process. The MIMO training field can be an HE-LTF, VHT-LTF or an HT-LTF. The wireless sensing may include detecting motion of an object in the space.

In a third example, a first wireless communication device: initiates a first mechanism to elicit a MIMO transmission from a second wireless communication device, and detects a failure of the first mechanism; initiates a second, different mechanism to elicit a MIMO transmission from the second wireless communication device, and detects a success of the second mechanism; generates a series of channel responses based on MIMO transmissions elicited from the second device using the second mechanism; and performs wireless sensing based on the series of channel responses.

Implementations of the third example may include one or more of the following features. The first mechanism and the second mechanism may include an ICMP Ping, a TCP Ping, an ARP Ping, or another type of request/response process. The first wireless communication device may initiate the first mechanism and the second mechanism (and possibly additional mechanisms) based on a state of a state machine. The wireless sensing may include detecting motion of an object in a space traversed by the MIMO transmissions.

In a fourth example, a first wireless communication device in a wireless communication network may: generate network or transport layer messages addressed to a second wireless communication device in the wireless communication network; wirelessly transmit the network or transport layer messages to the second wireless communication device to elicit multiple-input-multiple-output (MIMO) transmissions from the second wireless communication device; and receive MIMO transmissions from the second wireless communication device. The MIMO transmissions may traverse a space between the first wireless communication device and the second wireless communication device. The first wireless communication device may also identify a training field in each MIMO transmission; generate channel information based on the respective training fields; and detect motion that occurred in the space based on the channel information.

Implementations of the fourth example may include one or more of the following features. The network or transport layer messages includes network layer messages encapsulated into a payload field of respective Media Access Control (MAC) layer messages. The network layer messages are wirelessly transmitted according to an Internet Control Message Protocol (ICMP) Ping process. The first wireless communication device may further obtain a network layer address of the second wireless communication device; and encapsulate the network layer address of the second wireless communication device into the payload field of the respective MAC layer messages. The network or transport layer messages include transport layer messages encapsulated into a payload field of respective network layer messages, and the transport layer messages are wirelessly transmitted according to a Transmission Control Protocol (TCP) Ping process, an Address Resolution Protocol (ARP) Ping addressed to the second wireless communication device, or a combination thereof. The first wireless communication device may further detect a failure of the network or transport layer messages to elicit MIMO transmissions from the second wireless communication device; in response to detecting the failure, generate second network or transport layer messages addressed to the second wireless communication device; and wirelessly transmit the second network or transport layer messages to the second wireless communication device to elicit MIMO transmissions from the second wireless communication device. The network or transport layer messages are wirelessly transmitted according to a first type of communication process, and the second network or transport layer messages are wirelessly transmitted according to a second, different type of communication process. The first type of communication process and the second type of communication process are selected from the group consisting of an ICMP Ping, an ARP Ping addressed to the second wireless communication device, and a TCP Ping. Identifying the training field in each MIMO transmission includes identifying the training field in a PHY frame of each MIMO transmission.

In a fifth example, a non-transitory computer-readable medium stores instructions that are operable when executed by data processing apparatus to perform one or more operations of the first example, the second example, the third example, or the fourth example. In a sixth example, a system includes a plurality of wireless communication devices, and a device configured to perform one or more operations of the first example, the second example, the third example, or the fourth example.

Implementations of the sixth example may include one or more of the following features. One of the wireless communication devices can be or include the device. The device can be located remote from the wireless communication devices.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the description above.

What is claimed is:

1. A method, comprising:
by operation of a first wireless communication device in a wireless communication network:
receiving a first set of multiple-input-multiple-output (MIMO) transmissions from a second wireless communication device, the first set of MIMO transmission being received in response to a first set of network or transport layer messages wirelessly transmitted from the first wireless communication device to the second wireless communication device according to a first type of communication process;
identifying a first set of training fields in the first set of MIMO transmissions;
determining a training field reception rate based on information from a timing resource of the first wireless communication device, the training field reception rate representing a rate at which the first set of training fields were received;
in response to the training field reception rate satisfying a first condition, initializing the timing resource for a second, different type of communication process;

wirelessly transmitting a second set of second network or transport layer messages addressed to the second wireless communication device according to the second type of communication process to elicit a second set of MIMO transmissions from the second wireless communication device;

identifying a second set of training fields in the second set of MIMO transmissions;

generating channel information based on the second set of training fields; and processing the channel information in a motion detection system.

2. The method of claim 1, comprising:

determining a second training field reception rate based on information from the timing resource, the second training field reception rate representing a rate at which the second set of training fields were received; and generating the channel information in response to the second training field reception rate satisfying a second, different condition.

3. The method of claim 2, wherein processing the channel information comprises detecting motion that occurred in a space between the first wireless communication device and the second wireless communication device based on the channel information.

4. The method of claim 2, wherein the first condition comprises the training field reception rate being greater than a threshold, and the second condition comprises the training field reception rate being less than the threshold.

5. The method of claim 1, wherein the first type of communication process and the second type of communication process are selected from the group consisting of an Internet Control Message Protocol (ICMP) Ping process, an Address Resolution Protocol (ARP) Ping process addressed to the second wireless communication device, and a Transmission Control Protocol (TCP) Ping process.

6. The method of claim 5, wherein the first set of network or transport layer messages comprise first network layer messages encapsulated into a payload field of respective Media Access Control (MAC) layer messages, and the first type of communication process is the ICMP Ping process.

7. The method of claim 5, wherein the second set of network or transport layer messages comprise transport layer messages encapsulated into a payload field of respective network layer messages, and the second type of communication process is the ARP Ping process, the TCP Ping process, or a combination thereof.

8. The method of claim 1, comprising:

prior to receiving the first set of MIMO transmissions:

initializing the timing resource for the first type of communication process; and wirelessly transmitting the first set of network or transport layer messages addressed to the second wireless communication device according to the first type of communication process to elicit the first set of MIMO transmissions from the second wireless communication device, each first network or transport layer message being wirelessly transmitted at a distinct time determined by the timing resource.

9. A non-transitory computer-readable medium comprising instructions that are operable, when executed by data processing apparatus of a first wireless communication device in a wireless communication network, to perform operations comprising:

receiving a first set of multiple-input-multiple-output (MIMO) transmissions from a second wireless communication device, the first set of MIMO transmission being received in response to a first set of network or transport layer messages wirelessly transmitted from the first wireless communication device to the second wireless communication device according to a first type of communication process;

identifying a first set of training fields in the first set of MIMO transmissions;

determining a training field reception rate based on information from a timing resource of the first wireless communication device, the training field reception rate representing a rate at which the first set of training fields were received;

in response to the training field reception rate satisfying a first condition, initializing the timing resource for a second, different type of communication process;

wirelessly transmitting a second set of second network or transport layer messages addressed to the second wireless communication device according to the second type of communication process to elicit a second set of MIMO transmissions from the second wireless communication device;

identifying a second set of training fields in the second set of MIMO transmissions;

generating channel information based on the second set of training fields; and processing the channel information in a motion detection system.

10. The non-transitory computer-readable medium of claim 9, the operations comprising:

determining a second training field reception rate based on information from the timing resource, the second training field reception rate representing a rate at which the second set of training fields were received; and generating the channel information in response to the second training field reception rate satisfying a second, different condition.

11. The non-transitory computer-readable medium of claim 10, wherein processing the channel information comprises detecting motion that occurred in a space between the first wireless communication device and the second wireless communication device based on the channel information.

12. The non-transitory computer-readable medium of claim 10, wherein the first condition comprises the training field reception rate being greater than a threshold, and the second condition comprises the training field reception rate being less than the threshold.

13. The non-transitory computer-readable medium of claim 9, wherein the first type of communication process and the second type of communication process are selected from the group consisting of an Internet Control Message Protocol (ICMP) Ping process, an Address Resolution Protocol (ARP) Ping process addressed to the second wireless communication device, and a Transmission Control Protocol (TCP) Ping process.

14. The non-transitory computer-readable medium of claim 13, wherein the first set of network or transport layer messages comprise first network layer messages encapsulated into a payload field of respective Media Access Control (MAC) layer messages, and the first type of communication process is the ICMP Ping process.

15. The non-transitory computer-readable medium of claim 13, wherein the second set of network or transport layer messages comprise transport layer messages encapsulated into a payload field of respective network layer messages, and the second type of communication process is the ARP Ping process, the TCP Ping process, or a combination thereof.

16. The non-transitory computer-readable medium of claim 9, the operations comprising:
prior to receiving the first set of MIMO transmissions:
initializing the timing resource for the first type of communication process; and
wirelessly transmitting the first set of network or transport layer messages addressed to the second wireless communication device according to the first type of communication process to elicit the first set of MIMO transmissions from the second wireless communication device, each first network or transport layer message being wirelessly transmitted at a distinct time determined by the timing resource.

17. A wireless communication device, comprising:
a processor; and
memory comprising instructions which, when executed by the processor, cause the wireless communication device to perform operations comprising:
receiving a first set of multiple-input-multiple-output (MIMO) transmissions from a second wireless communication device, the first set of MIMO transmission being received in response to a first set of network or transport layer messages wirelessly transmitted from the wireless communication device to the second wireless communication device according to a first type of communication process;
identifying a first set of training fields in the first set of MIMO transmissions;
determining a training field reception rate based on information from a timing resource of the wireless communication device, the training field reception rate representing a rate at which the first set of training fields were received;
in response to the training field reception rate satisfying a first condition, initializing the timing resource for a second, different type of communication process;
wirelessly transmitting a second set of second network or transport layer messages addressed to the second wireless communication device according to the second type of communication process to elicit a second set of MIMO transmissions from the second wireless communication device;
identifying a second set of training fields in the second set of MIMO transmissions;
generating channel information based on the second set of training fields; and
processing the channel information in a motion detection system.

18. The wireless communication device of claim 17, the operations comprising:
determining a second training field reception rate based on information from the timing resource, the second training field reception rate representing a rate at which the second set of training fields were received; and
generating the channel information in response to the second training field reception rate satisfying a second, different condition.

19. The wireless communication device of claim 18 wherein processing the channel information comprises detecting motion that occurred in a space between the wireless communication device and the second wireless communication device based on the channel information.

20. The wireless communication device of claim 18, wherein the first condition comprises the training field reception rate being greater than a threshold, and the second condition comprises the training field reception rate being less than the threshold.

21. The wireless communication device of claim 17, wherein the first type of communication process and the second type of communication process are selected from the group consisting of an Internet Control Message Protocol (ICMP) Ping process, an Address Resolution Protocol (ARP) Ping process addressed to the second wireless communication device, and a Transmission Control Protocol (TCP) Ping process.

22. The wireless communication device of claim 21, wherein the first set of network or transport layer messages comprise first network layer messages encapsulated into a payload field of respective Media Access Control (MAC) layer messages, and the first type of communication process is the ICMP Ping process.

23. The wireless communication device of claim 21, wherein the second set of network or transport layer messages comprise transport layer messages encapsulated into a payload field of respective network layer messages, and the second type of communication process is the ARP Ping process, the TCP Ping process, or a combination thereof.

24. The wireless communication device of claim 17, the operations comprising:
prior to receiving the first set of MIMO transmissions:
initializing the timing resource for the first type of communication process; and
wirelessly transmitting the first set of network or transport layer messages addressed to the second wireless communication device according to the first type of communication process to elicit the first set of MIMO transmissions from the second wireless communication device, each first network or transport layer message being wirelessly transmitted at a distinct time determined by the timing resource.

* * * * *